(12) United States Patent
Soles et al.

(10) Patent No.: US 11,907,889 B2
(45) Date of Patent: *Feb. 20, 2024

(54) SYSTEM, METHOD, AND COMPUTER-READABLE MEDIUM FOR DISPLAYING LAYOUT-BASED INSTRUCTIONS USING AUGMENTED REALITY

(71) Applicant: Blue Yonder Group, Inc., Scottsdale, AZ (US)

(72) Inventors: Justin Soles, Ormeaux (CA); Benoît Rochon, Montreal (CA); Christopher Tyler, Montreal (CA)

(73) Assignee: Blue Yonder Group, Inc., Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/144,660

(22) Filed: May 8, 2023

(65) Prior Publication Data
US 2023/0274218 A1 Aug. 31, 2023

Related U.S. Application Data

(63) Continuation of application No. 17/983,702, filed on Nov. 9, 2022, now Pat. No. 11,681,973, which is a
(Continued)

(51) Int. Cl.
*G06Q 30/00* (2023.01)
*G06Q 10/083* (2023.01)
(Continued)

(52) U.S. Cl.
CPC ........ *G06Q 10/083* (2013.01); *G06Q 10/087* (2013.01); *G06Q 30/0635* (2013.01); *G06T 19/006* (2013.01)

(58) Field of Classification Search
None
See application file for complete search history.

(56) References Cited

U.S. PATENT DOCUMENTS 6,721,762 B1 * 4/2004 Levine ............... G06Q 10/08
707/999.102
9,639,909 B2 5/2017 Baldwin
(Continued)

OTHER PUBLICATIONS

Li-Chen Wu, I-Chen Lin, and Ming-Han Tsai, Augmented reality instruction for object assembly based on markerless tracking, Feb. 2016, Proceedings of the 20th ACM SIGGRAPH Symposium on Interactive 3D Graphics and Games (I3D '16), pp. 95-102. (Year: 2016).*

(Continued)

*Primary Examiner* — Jeffrey A. Smith
*Assistant Examiner* — Brittany E Bargeon
(74) *Attorney, Agent, or Firm* — Spencer Fane LLP; Steven J. Laureanti

(57) ABSTRACT

A system and method are disclosed for a supply chain entity having an inventory of one or more items and a warehouse management system receiving orders for one or more items, determining a container for the one or more items, and generating a packing plan for the items. Aspects of the embodiments may include one or more instruction rendering devices having a sensor and a displaying augmented reality instructions and feedback.

20 Claims, 9 Drawing Sheets

Related U.S. Application Data continuation of application No. 15/907,874, filed on Feb. 28, 2018, now Pat. No. 11,514,386.

(60) Provisional application No. 62/585,701, filed on Nov. 14, 2017, provisional application No. 62/465,538, filed on Mar. 1, 2017.

(51) Int. Cl.
    *G06T 19/00*         (2011.01)
    *G06Q 10/087*      (2023.01)
    *G06Q 30/0601*     (2023.01)

(56) References Cited

U.S. PATENT DOCUMENTS

| | | | |
|---|---|---|---|
| 10,161,746 | B2 | 12/2018 | Ochsendorf et al. |
| 10,287,116 | B2 | 5/2019 | Daun et al. |
| 11,514,386 | B1 * | 11/2022 | Soles ............... G06Q 10/083 |
| 11,681,973 | B1 * | 6/2023 | Soles ............... G06Q 30/0635 |
| | | | 705/26.81 |
| 2014/0108136 | A1 | 4/2014 | Zhao et al. |
| 2016/0304299 | A1 * | 10/2016 | Daun ................ G06Q 50/28 |
| 2018/0018619 | A1 * | 1/2018 | Kisiler .............. G06Q 10/083 |

OTHER PUBLICATIONS

Luiz Antonio Carraro et al. "A Clonal Selection Algorithm for the Container Stacking Problem", IEEE, Oct. 2011. Retrieved on Feb. 1, 2018 at http://ieeexplore.ieee.org/document/6089651/?reload=true.

Chen-Fu Chien et al. "A container packing support system for determining and visualizing container packing patterns", http://dx.doi.org/10.1016/S0167-9236(02)00192-6 redirected to https://www.sciencedirect.com/science/article/pii/S0167923602001926?via%3Dihub—Retrieved on Feb. 1, 2018.

https://www.esko.com/en/products/cape-pack retrieved on Feb. 1, 2018.

TOPS Pro http://www.topseng.com/ retrieved on Feb. 1, 2018.

Matt Adcock et al. "Object-Based Touch Manipulation for Remote Guidance of Physical Tasks", Oct. 4-5, 2014, Spatial Pointing and Touching, SUI'14, pp. 113-122. (Year: 2014).

Li-Chen Wu et al. "Augmented reality instruction for object assembly based on markerless tracking", Feb. 2016, Proceedings of the 20th ACM SIGGRAPH Symposium on Interactive 3D Graphics and Games (130 '16), pp. 95-102. (Year: 2016).

* cited by examiner

SYSTEM, METHOD, AND COMPUTER-READABLE MEDIUM FOR DISPLAYING LAYOUT-BASED INSTRUCTIONS USING AUGMENTED REALITY

CROSS-REFERENCE TO RELATED APPLICATIONS

This application is a continuation of U.S. patent application Ser. No. 17/983,702, filed on Nov. 9, 2022, entitled "System, Method, And Medium For Displaying Layout-Based Instructions Using Augmented Reality", which is a continuation of U.S. patent application Ser. No. 15/907,874, filed on Feb. 28, 2018, entitled "System and Method of Displaying Layout-Based Instructions Using Augmented Reality," now U.S. Pat. No. 11,514,386, which claims the benefit under 35 U.S.C. § 119(e) to U.S. Provisional Application No. 62/585,701, filed Nov. 14, 2017 and entitled "System and Method of Displaying Layout-Based Instructions Using Augmented Reality" and U.S. Provisional Application No. 62/465,538, filed Mar. 1, 2017, and entitled "Three-Dimensional Pallet Building Training and Visualization." U.S. patent application Ser. No. 17/983,702, U.S. Pat. No. 11,514,386, and U.S. Provisional Application Nos. 62/585,701 and 62/465,538 are assigned to the assignee of the present application.

TECHNICAL FIELD

The present disclosure relates generally to packing planning and specifically to a system and method of generating and visualizing packing layouts.

BACKGROUND

Shipping items between various supply chain entities may require selecting various items, containers, or packages and packing these objects in a particular configuration to avoid damage during shipment. Because any particular objects may comprise various different sizes, determining a configuration that prevents damage while ensuring efficient use of space is difficult. Even when the selection of objects is known beforehand, a suitable configuration indicating how to pack and stack one or more containers, packages, or items, is not known. As a result, objects packed on a pallet, for example, are frequently improperly packed and stacked, which reduces, among other things, the shipment's strength, torsion, and resistance to airflow. The inability to quickly generate proper packing configurations is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
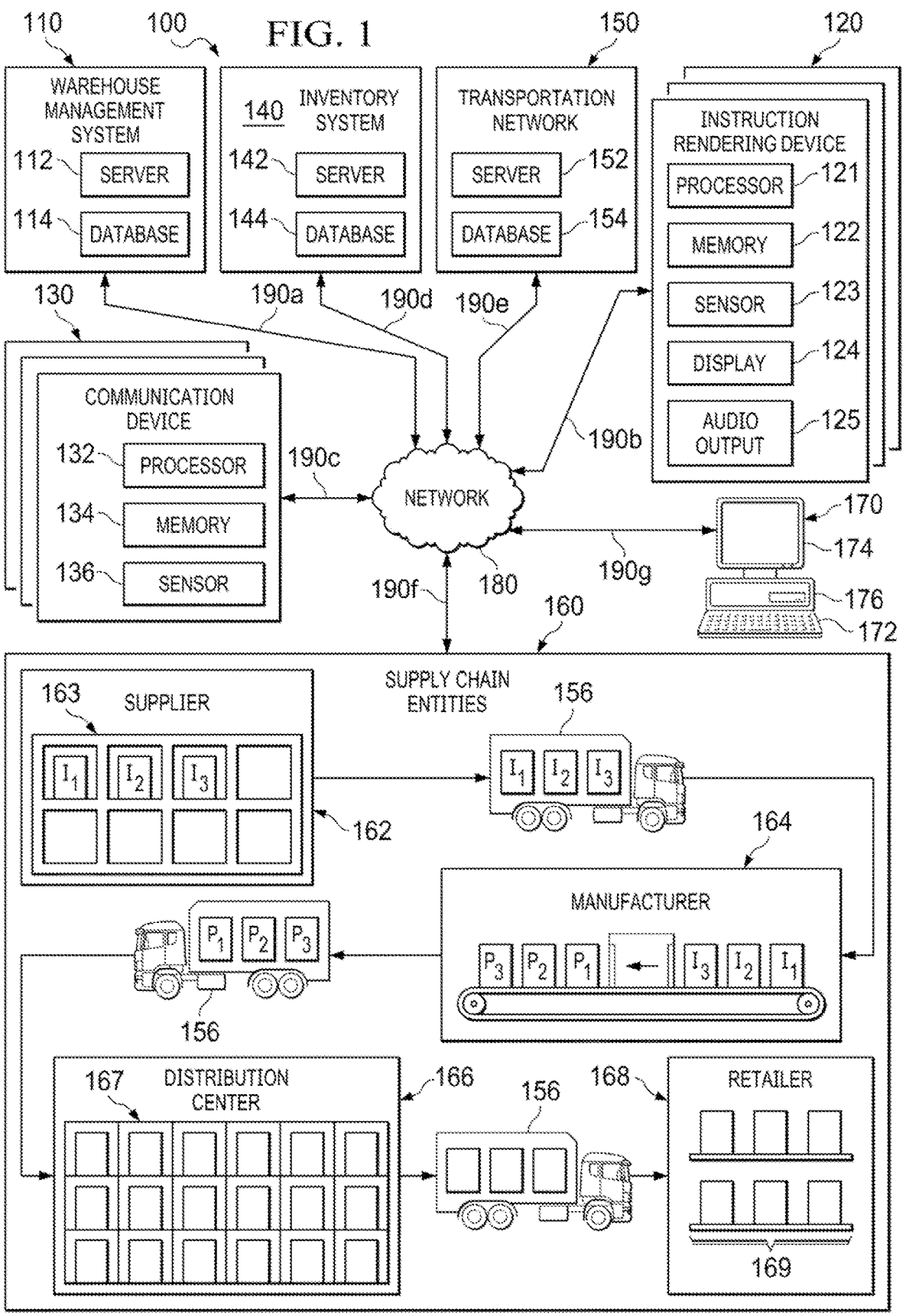
FIG. 1 illustrates an exemplary supply chain network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to a warehouse management system and one or more instruction rendering devices that train and guide how to properly pack and load items, packages, containers, pallets, boxes, and other objects into a packing area, package, or container. According to further embodiments, warehouse management system and one or more instruction rendering devices displays a visualization that directs one or more users to properly pack objects according to a calculated packing plan. According to particular aspects, one or more instruction rendering devices may render instructions, directions, or feedback as one or more visual or audio elements that are communicated to the user to guide and train proper packing of one or more objects into one or more packing areas.

As described in more detail below, one or more disclosed embodiments comprise generating a packing plan to indicate how to load items or packages onto a pallet, while other embodiments comprise generating a packing plan indicating how to load boxes or products onto a truck, trailer, or other larger packing area. For example, embodiments may indicate a sequence of actions and feedback that indicate how to pack items into a box, pack these boxes onto a pallet, and then how to load the pallets into a truck, trailer, shipping container, and the like.

FIG. 1 illustrates exemplary supply chain network 100 according to an embodiment. Supply chain network 100 comprises warehouse management system 110, one or more instruction rendering devices 120, one or more communication devices 130, inventory system 140, transportation network 150, one or more supply chain entities 160, computer 170, network 180, and communication links 190a-190g. Although a single warehouse management system 110, one or more instruction rendering devices 120, one or more communication devices 130, a single inventory system 140, a single transportation network 150, one or more supply chain entities 160, a single computer 170, and a single network 180, are shown and described, embodiments contemplate any number of warehouse management systems, instruction rendering devices 120, communication devices, inventory systems, transportation systems, supply chain entities, computers, or networks, according to particular needs.

In one embodiment, warehouse management system 110 comprises server 112 and database 114. According to embodiments, server 112 comprises one or more modules that manage and operate warehouse operations, plan timing and identity of shipments, generate picklists, packing plans, and instruction sets and feedback. According to embodiments, warehouse management system 110 comprises a live mode and a training mode. According to a live mode, warehouse management system 110 instructs users to obtain picked items and generates instructions and feedback to guide placement of items on the picklist in the configuration and layout determined by a packing plan. For example, the instructions and feedback may guide a user to prepare items on a picklist for shipment by obtaining the items from inventory or a staging area and packing the items on a pallet in a proper configuration for shipment. According to a training mode, warehouse management system 110 generates instructions for training a user on techniques for proper packing, stacking, and handling of items. The training mode of warehouse management system 110 may help train users in the proper packing and handling of items (such as, for example, stacking packages on pallets) without having to use genuine goods, which may be expensive, fragile, or dangerous. For example, a luxury goods manufacturers may produce high-value or exceptionally fragile items, and hazardous material manufacturers may produce toxic or explosive items. As described more fully below, warehouse management system 110 trains new employees to pack and handle items without using genuine high-value, fragile, or dangerous items.

Although embodiments of warehouse management system 110 are explained in relation to pallet packing, embodiments contemplate warehouse management system 110 generating packing instructions for proper packing of any item, package, or container into any packing area, including, packing any item, package, or container in another item, package, or container. For example, warehouse management system 110 may generate instructions for packing products into boxes, packing boxes onto pallets, packing loaded pallets into trucks, or placing any item, container, or package in a packing area, such as, for example, a box, a pallet, a shipping container, a transportation vehicle 158, a shelf, a designated location in a warehouse (such as a staging area), and the like.

According to embodiments, one or more instruction rendering devices 120 comprise an electronic device that receives packing instructions from warehouse management system 110 and displays instructions and feedback to direct item packing. One or more instruction rendering devices 120 may comprise, for example, a head-mounted display, a smartphone, a tablet computer, a mobile device, a projector, or other like devices. According to embodiments, one or more instruction rendering devices 120 comprise one or more processors 121, memory 122, one or more sensors 123, one or more displays 124, one or more audio outputs 125 and may include any suitable input device, output device, fixed or removable non-transitory computer-readable storage media, or the like. In addition, or as an alternative, one or more sensors 123 may comprise an object detection sensor, such as, for example, an imaging sensor, a camera, a LIDAR system, a radar system, an infrared detector, a sonar system, or any other electronic component that detects or identifies physical objects or characteristics of physical objects such as, for example, an object's size, weight, dimensions, location, orientation, physical extent, and the like. The object detection sensors may work in connection with other sensors that detect, for example, head movement, field of vision, gaze, orientation, location, and the like.

One or more displays 124 of one or more instruction rendering devices 120 may comprise a projector, monitor, LCD screen, or any other suitable electronic display device. Embodiments contemplate one or more instruction rendering devices 120 having at least two displays 124, including a first one display configured to direct an image into a user's left eye and a second display configured to direct an image into a user's right eye. According to embodiments, one or more displays 124 may display an augmented or virtual reality visualization by, for example, displaying visual elements on a transparent or translucent display so that the visual element appears within the visual field of the user and altering the appearance and placement of the visual element based, at least in part, on the predicted visual field of the user. Additionally, or in the alternative, one or more displays 124 may display an augmented or virtual reality visualization on an opaque display by overlaying one or more visual elements over a camera feed and altering the appearance and placement of the visual elements based on one or more frames of the camera feed. For example, one or more instruction rendering devices 120 may comprise an augmented reality headset capable of displaying instructions and feedback in the visual field of a user and updating the appearance and location of the instructions and feedback based on the predicted visual field of the user. Augmented reality headsets may comprise, for example, the MICROSOFT HOLOLENS, META 2 and EPSON MOVERIO BT-200 augmented reality headsets.

Instruction rendering device 120 may display visual information, such as, for example, instructions, feedback, or other information by superimposing one or more visual elements over a packing area or an object, such as, an item, package, or container. For example, visual elements (such as, for example, graphics, colors, and text) may display instructions, feedback, or other information and may be displayed so that the visual elements appear superimposed on real-world packing areas and objects such as, for example, shelves, boxes, pallets, shipping containers, trucks, trailers, warehouse locations, and the like. According to embodiments, one or more sensors 123 of one or more instruction rendering devices 120 detect an object or a packing area, and in response, one or more instruction rendering devices 120 map the location of the detected object or packing area, calculate the dimensions, volume, or area in the visual field occupied by the detected object or packing area, and/or superimpose visual elements over or in connection with the detected objects or packing areas. Additionally, or in the alternative, one or more instruction rendering devices 120 receive dimensions, volumes, or areas for detected objects or packing areas stored on one or more databases in supply chain network 100. According to embodiments, by superimposing visual elements over real-world objects, one or more instruction rendering devices 120 generates a visualization that identifies the location and size of the packing area, displays the instructions for packing objects in a packing area directly on the objects and packing area, monitors the location of objects to identify if an object was packed according to instructions, displays data describing detected objects in connection with the detected objects including, for example, identity, weight, dimensions, packing instructions (such as whether a particular side needs to be in an up direction, how many other objects may be packed on top of the object, how the object is to be oriented, where in a package, container, or packing area the object is to be placed, or like packing instructions), inventory levels, expiration date, object category, or any other information about the detected object. Additionally, one or more sensors 123 of one or more instruction rendering devices 120 may be located at one or more locations local to, or remote from, the one or more instruction rendering devices 120, including, for example, one or more sensors 123 integrated into one or more instruction rendering devices 120 and/or one or more sensors 123 distantly located from one or more instruction rendering devices 120 and communicatively coupled to the one or more instruction rendering devices 120. According to some embodiments, one or more instruction rendering devices 120 comprise audio output 125, such as, for example, a speaker, that generates auditory feedback, instructions, or the like.

Inventory system 140 comprises server 142 and database 144. Server 142 of inventory system 140 is configured to receive and transmit item data, including item identifiers, pricing data, attribute data, inventory levels, and other like data about one or more items at one or more locations in the supply chain network 100. Server 142 stores and retrieves item data from database 144 or from one or more locations in supply chain network 100.

One or more communication devices 130 comprise one or more processors 132, memory 134, one or more sensors 136, and may include any suitable input device, output device, fixed or removable computer-readable storage media, or the like. According to embodiments, one or more communication devices 130 comprise an electronic device that receives imaging information from one or more sensors 136 or from one or more databases in supply chain network 100. According to embodiments, one or more communication devices 130 identify items near one or more sensors 136 and generate a mapping of the item in supply chain network 100. As explained in more detail below, warehouse management system 110, one or more instruction rendering devices 120, one or more communication devise 130, inventory system 140, and transportation network 150 may use the mapping of an item to locate the item in supply chain network 100. The location of the item is then used to coordinate the storage and transportation of items in supply chain network 100 to implement a shipping and inventory plan determined by warehouse management system 110 and/or one or more other factors described herein.

One or more communication devices 130 may comprise a mobile handheld electronic device such as, for example, a smartphone, a tablet computer, a wireless device, or the like. In addition, or as an alternative, one or more communication devices 130 comprise one or more networked electronic devices configured to transmit item identity information to one or more databases as an item passes by or is scanned by sensor 136. This may include, for example, a stationary scanner located at one or more supply chain entities 160 that identifies items as the items pass near the scanner. One or more sensors 136 of one or more communication devices 130 may comprise an imaging sensor, such as, a camera, scanner, electronic eye, photodiode, charged coupled device (CCD), or any other electronic sensor that detects images of objects. In addition, or as an alternative, one or more sensors 136 may comprise a radio receiver and/or transmitter 206 configured to read an electronic tag, such as, for example, a radio-frequency identification (RFID) tag. In addition, or as an alternative, each of the one or more items may be represented in supply chain network 100 by an identifier, including, for example, Stock-Keeping Unit (SKU), Universal Product Code (UPC), serial number, barcode, tag, RFID, or any other object that encodes identifying information. As discussed above, one or more communication devices 130 may generate a mapping of one or more items in the supply chain network 100 by scanning an identifier or object associated with an item and identifying the item based, at least in part, on the scan. Additionally, one or more sensors 136 of one or more communication devices 130 may be located at one or more locations local to, or remote from, the one or more communication devices 130, including, for example, one or more sensors 136 integrated into one or more communication devices 130 or one or more sensors 136 distantly located from one or more communication devices 130 and communicatively coupled to the one or more communication devices 130. According to some embodiments, one or more sensors 123 of one or more instruction rendering devices 120, one or more sensors 136 of one or more communication devices 130, and any additional sensors local to, or remote from, supply chain network 100 may be communicatively coupled such that any sensor may be configured to communicate directly or indirectly with one or more of warehouse management system 110, one or more instruction rendering devices 120, one or more communication devices 130, inventory system 140, transportation network 150, one or more supply chain entities 160, computer 170, and/or network 180 using one or more communication links 190a-190g.

Transportation network 150 comprises server 152 and database 154. According to embodiments, transportation network 150 directs one or more transportation vehicles 156 to ship one or more items between one or more supply chain entities 160, based, at least in part, on a shipping and inventory plan determined by warehouse management system 110, the number of items currently in stock at one or more supply chain entities 160, the number of items currently in transit in the transportation network 150, forecasted demand, a supply chain disruption, and/or one or more other factors described herein. Transportation vehicles 156 comprise, for example, any number of trucks, cars, vans, boats, airplanes, unmanned aerial vehicles (UAVs), cranes, robotic machinery, or the like. Transportation vehicles 156 may comprise radio, satellite, or other communication that communicates location information (such as, for example, geographic coordinates, distance from a location, global positioning satellite (GPS) information, or the like) with warehouse management system 110, one or more instruction rendering devices 120, one or more communication devices 130, inventory system 140, transportation network 150, and/or one or more supply chain entities 160 to identify the location of the transportation vehicle 156 and the location of any inventory or shipment located on the transportation vehicle 156.

As shown in FIG. 1, supply chain network 100 operates on one or more computers 170 that are integral to or separate from the hardware and/or software that support warehouse management system 110, one or more instruction rendering devices 120, one or more communication devices 130, inventory system 140, transportation network 150, and one or more supply chain entities 160. Supply chain network 100 comprising warehouse management system 110, one or more instruction rendering devices 120, one or more communication devices 130, inventory system 140, transportation network 150, and one or more supply chain entities 160 may operate on one or more computers 170 that are integral to or separate from the hardware and/or software that support warehouse management system 110, one or more instruction rendering devices 120, one or more communication devices 130, inventory system 140, transportation network 150, and one or more supply chain entities 160. Computers 170 may include any suitable input device 172, such as a keypad, mouse, touch screen, microphone, or other device to input information. Output device 174 may convey information associated with the operation of supply chain network 100, including digital or analog data, visual information, or audio information. Computer 170 may include fixed or removable computer-readable storage media, including a non-transitory computer readable medium, magnetic computer disks, flash drives, CD-ROM, in-memory device or other suitable media to receive output from and provide input to supply chain network 100.

Computer 170 may include one or more processors 176 and associated memory to execute instructions and manipulate information according to the operation of supply chain network 100 and any of the methods described herein. In addition, or as an alternative, embodiments contemplate executing the instructions on computer 170 that cause computer 170 to perform functions of the method. Further examples may also include articles of manufacture including tangible non-transitory computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from warehouse management system 110, one or more instruction rendering devices 120, one or more communication devices 130, inventory system 140, transportation network 150, and one or more supply chain entities 160. In addition, each of the one or more computers 170 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with the inventory planer 110, one or more instruction rendering devices 120, one or more communication devices 130, inventory system 140, transportation network 150, and one or more supply chain entities 160. These one or more users may include, for example, a "manager" or a "planner" handling planning for item inventory and shipments and/or one or more related tasks within supply chain network 100. In addition, or as an alternative, these one or more users within the system may include, for example, one or more computers 170 programmed to autonomously handle, among other things, one or more supply chain processes such as demand planning, supply and distribution planning, inventory management, allocation planning, order fulfilment, adjustment of manufacturing and inventory levels at various stocking points, and/or one or more related tasks within supply chain network 100.

One or more supply chain entities 160 represent one or more supply chain networks, including one or more enterprises, such as, for example networks of one or more suppliers 162, manufacturers 164, distribution centers 166, retailers 168 (including brick and mortar and online stores), customers, and/or the like. Suppliers 162 may be any suitable entity that offers to sell or otherwise provides one or more items (i.e., materials, components, or products) to one or more manufacturers 164. Suppliers 162 may comprise automated distribution systems 163 that automatically transport products to one or more manufacturers 164 based, at least in part, on a shipping and inventory plan determined by warehouse management system 110 and/or one or more other factors described herein.

Manufacturers 164 may be any suitable entity that manufactures at least one product. Manufacturers 164 may use one or more items during the manufacturing process to produce any manufactured, fabricated, assembled, or otherwise processed item, material, component, good, or product. In one embodiment, a product represents an item ready to be supplied to, for example, one or more supply chain entities 160 in supply chain network 100, such as retailers 168, an item that needs further processing, or any other item. Manufacturers 164 may, for example, produce and sell a product to suppliers 162, other manufacturers 164, distribution centers 166, retailers 168, a customer, or any other suitable person or entity. Manufacturers 164 may comprise automated robotic production machinery 165 that produce products based, at least in part, on a shipping and inventory plan determined by warehouse management system 110 and/or one or more other factors described herein.

Distribution centers 166 may be any suitable entity that offers to store or otherwise distribute at least one product to one or more retailers 168 and/or customers. Distribution centers 166 may, for example, receive a product from a first one or more supply chain entities 160 in supply chain network 100 and store and transport the product for a second one or more supply chain entities 160. Distribution centers 166 may comprise automated warehousing systems 167 that automatically remove products from and place products into inventory based, at least in part, on a shipping and inventory plan determined by warehouse management system 110 and/or one or more other factors described herein.

Retailers 168 may be any suitable entity that obtains one or more products to sell to one or more customers. Retailers 168 may comprise any online or brick-and-mortar store, including stores with shelving systems 169. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailers 168 based on computer-generated instructions or automatically by machinery to place products in a desired location in retailers 168 and which may be based, at least in part, on a shipping and inventory plan determined by warehouse management system 110 and/or one or more other factors described herein.

Although one or more supply chain entities 160 are shown and described as separate and distinct entities, the same entity may simultaneously act as any one of the one or more supply chain entities 160. For example, one or more supply chain entities 160 acting as a manufacturer can produce a product, and the same one or more supply chain entities 160 can act as a supplier to supply an item to itself or another one or more supply chain entities 160. Although one example of a supply chain network 100 is shown and described, embodiments contemplate any configuration of supply chain network 100, without departing from the scope described herein.

In one embodiment, warehouse management system 110 may be coupled with network 180 using communications link 190*a*, which may be any wireline, wireless, or other link suitable to support data communications between warehouse management system 110 and network 180 during operation of supply chain network 100. One or more instruction rendering devices 120 may be coupled with network 180 using communications link 190*b*, which may be any wireline, wireless, or other link suitable to support data communications between one or more instruction rendering devices 120 and network 180 during operation of supply chain network 100. One or more communication devices 130 are coupled with network 180 using communications link 190*c*, which may be any wireline, wireless, or other link suitable to support data communications between one or more communication devices 130 and network 180 during operation of distributed supply chain network 100. Inventory system 140 may be coupled with network 180 using communications link 190*d*, which may be any wireline, wireless, or other link suitable to support data communications between inventory system 140 and network 180 during operation of supply chain network 100. Transportation network 150 may be coupled with network 180 using communications link 190*e*, which may be any wireline, wireless, or other link suitable to support data communications between transportation network 150 and network 180 during operation of supply chain network 100. One or more supply chain entities 160 may be coupled with network 180 using communications link 190*f*, which may be any wireline, wireless, or other link suitable to support data communications between one or more supply chain entities 160 and network 180 during operation of supply chain network 100. Computer 170 may be coupled with network 180 using communications link 190*g*, which may be any wireline, wireless, or other link suitable to support data communications between computer 170 and network 180 during operation of supply chain network 100.

Although communication links 190*a*-190*g* are shown as generally coupling one or warehouse management system 110, one or more instruction rendering devices 120, one or more communication devices 130, inventory system 140, transportation network 150, one or more supply chain entities 160, and computer 170 to network 180, any of warehouse management system 110, one or more instruction rendering devices 120, one or more communication devices 130, inventory system 140, transportation network 150, one or more supply chain entities 160, and computer 170 may communicate directly with each other, according to particular needs.

In another embodiment, network 180 includes the Internet and any appropriate local area networks (LANs), metropolitan area networks (MANs), or wide area networks (WANs) coupling warehouse management system 110, one or more instruction rendering devices 120, one or more communication devices 130, inventory system 140, transportation network 150, one or more supply chain entities 160, and computer 170. For example, data may be maintained locally to, or externally of, warehouse management system 110, one or more instruction rendering devices 120, one or more communication devices 130, inventory system 140, transportation network 150, one or more supply chain entities 160, and computer 170 and made available to one or more associated users of warehouse management system 110, one or more instruction rendering devices 120, one or more communication devices 130, inventory system 140, transportation network 150, one or more supply chain entities 160, and computer 170 using network 180 or in any other appropriate manner. For example, data may be maintained in a cloud database at one or more locations external to warehouse management system 110, one or more instruction rendering devices 120, one or more communication devices 130, inventory system 140, transportation network 150, one or more supply chain entities 160, and computer 170 and made available to one or more associated users of warehouse management system 110, one or more instruction rendering devices 120, one or more communication devices 130, inventory system 140, transportation network 150, one or more supply chain entities 160, and computer 170 using the cloud or in any other appropriate manner. Those skilled in the art will recognize that the complete structure and operation of network 180 and other components within supply chain network 100 are not depicted or described. Embodiments may be employed in conjunction with known communications networks and other components.

In accordance with the principles of embodiments described herein, warehouse management system 110 may generate an inventory plan, a picklist, a packing plan, and/or a shipping plan for items of one or more supply chain entities 160 in supply chain network 100. Additionally, warehouse management system 110, one or more instruction rendering devices 120 one or more communication devices 130, inventory system 140, transportation network 150, and/or one or more supply chain entities 160 may comprise a server and database comprising one or more modules to perform one or more planning and execution processes including demand planning processes, supply planning processes, demand fulfillment processes, an order entry system, and the like. Furthermore, warehouse management system 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities, and the configuration and quantity of packaging and shipping of items based on one or more generated inventory plans, picklists, packing plans, shipping plans and/or current inventory or production levels. For example, the methods described herein may include computers 170 receiving item data 210 (FIG. 2) from automated machinery having at least one sensor and item data 210 corresponding to an item detected by the automated machinery. The received item data 210 may include an image of the item, an identifier, item attributes (dimensions, texture, estimated weight, and any other like attributes), and/or other data associated with the item. The method may further include computer 170 looking up received item data 210 in a database system associated with warehouse management system 110 to identify the item corresponding to item data 210 received from the automated machinery.

Computers 170 may also receive, from one or more sensors 123 of one or more instruction devices 120 and/or from sensor 136 associated with one or more communication devices 130, a current location of an identified object. Based on the identification of the object, computers 170 may also identify (or alternatively generate) a first mapping in the database system, where the first mapping is associated with the current location of the identified object. Computers 170 may also identify a second mapping in the database system, where the second mapping is associated with a past location of the identified object. Computers 170 may also compare the first mapping and the second mapping to determine if the current location of the identified object in the first mapping is different than the past location of the identified object in the second mapping. Computers 170 may then send instructions to one or more instruction rendering devices 120 or the automated machinery based, as least in part, on one or more differences between the first mapping and the second mapping such as, for example, to locate items to add to or remove from an inventory, container, or package for one or more supply chain entities.

According to these embodiments, and as discussed in more detail below, warehouse management system 110 may determine a difference between current inventory levels and the inventory reorder points for one or more items in an inventory. Based on the difference, warehouse management system 110 may instruct the automated machinery to add items to a shipment in an amount equal to the inventory target quantities minus the difference between current inventory levels and the inventory reorder points. For example, warehouse management system 110 may determine a picklist, an inventory plan, a packing plan, or a shipping plan based on forecasted demand, current inventory levels, forecasted production levels, item attributes, pack constraints, store constraints, and the like. Based on these factors and constraints, warehouse management system 110 generates instructions, feedback, and a visualization of packing and stacking one or more objects on a packing area for display on one or more instruction rendering devices 120.

Figure 2:
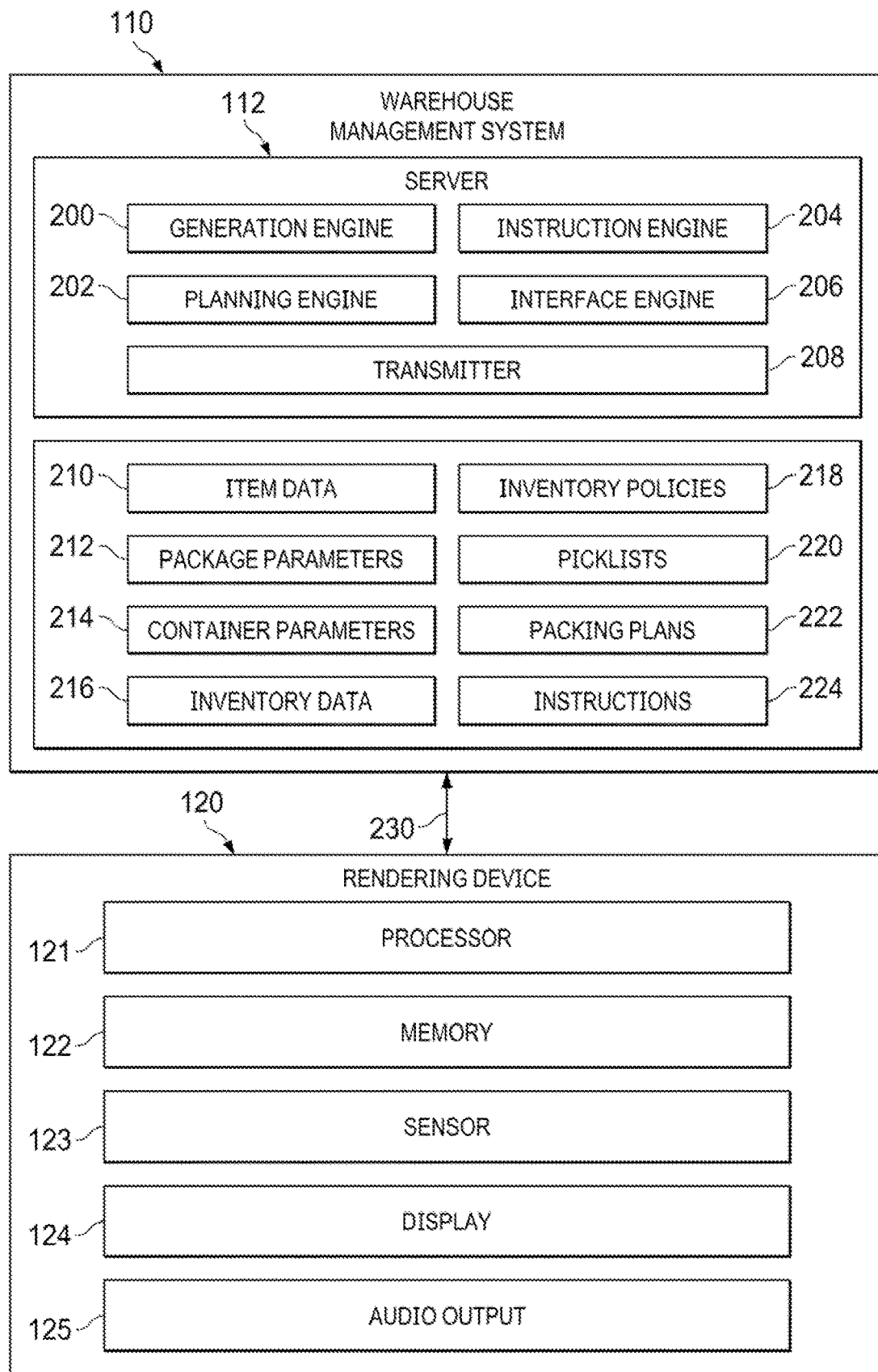
FIG. 2 illustrates the warehouse management system and the one or more instruction rendering devices of FIG. 1 in greater detail, in accordance with an embodiment.

FIG. 2 illustrates warehouse management system 110 and one or more instruction rendering devices 120 of FIG. 1 in greater detail, according to an embodiment. As discussed above, warehouse management system 110 may comprise server 112 and database 114. Although warehouse management system 110 is shown as a single server 112 and a single database 114, embodiments contemplate any suitable number of servers or databases internal to or externally coupled with warehouse management system 110.

Server 112 of warehouse management system 110 may comprise generation engine 200, planning engine 202, instruction engine 204, interface engine 206, and transmitter 208. One or more instruction rendering devices 120 may be coupled with warehouse management system 110 using communication link 230, which may be any wireline, wireless, or other link suitable to support data communications between warehouse management system 110 and one or more instruction rendering devices 120. Although a single generation engine 200, a single planning engine 202, a single instruction engine 204, a single interface engine 206, a single transmitter 208, and one or more instruction rendering devices 120 are shown and described, embodiments contemplate any number of engines, transmitters, and instruction rendering devices, located at one or more locations, external or internal to warehouse management system 110.

According to embodiments, generation engine 200 of warehouse management system 110 receives an order and produces a picklist comprising a list of products, boxes, containers, packages, pallets, or any item that is picked to be placed in a shipment. The produced list of items, or picklist, is then transmitted to a mover that picks the items or products and places them in a staging area. According to some embodiments, the mover may comprise a human retrieving items from a warehouse. According to other embodiments, the mover may comprise automated warehouse machinery that retrieves items from a first location (including, for example, a transportation vehicle 156, an inventory of one or more supply chain entities 160, a warehouse, a container, and the like) and transports the items to a staging area. According to embodiments, generation engine 200 produces a picklist based, at least in part, on a shipment configuration and a quantity of times needed to satisfy demand. The shipment configuration may comprise, for example, size of the shipment, the number of items in the shipment, and the attributes of items in the shipment. In addition, generation engine 200 may base the shipment configuration, at least in part, on shipping constraints, including, for example, a maximum and minimum order quantity, a maximum and minimum number of items in a shipment, an overstock of an item, disallowed shipment configurations, and the like.

According to an embodiment, planning engine 202 of warehouse management system 110 receives picklist from generation engine 200. Based at least in part on the received picklist of generation engine 200, planning engine 202 determines a packing plan. As describe in more detail below, a packing plan may comprise a configuration for placing objects within a packing area in preparation for shipment. A packing area may comprise a two-dimensional or three-dimensional shape defining the space inside of which objects may be placed. For example, according to some embodiments, a packing area comprises a two-dimensional surface having a perimeter that defines the area inside of which objects are to be placed. Additionally, or in the alternative, a packing area comprises a three-dimensional volume having one or more outer surfaces that define the volume inside of which objects are to be placed.

According to an embodiment, a packing plan may indicate how to load items onto a pallet or other packing container, how to load items into containers, how to load items or containers onto a truck, trailer, or other transportation vehicle 156, and the like. For example, instead of loading boxes onto a pallet or packing area, warehouse management system 110 may be used to load items that need to be packed into a box and then the boxes that need to be packed onto a pallet and then the pallets that need to be backed into a container or other packing area.

Additionally, planning engine 202 may generate a packing plan based on constraints associated with the packing area, the items, the packages, and/or the containers. To further illustrate, an example is now given. In the following example, warehouse management system 110 generates a packing plan for packing various products onto several empty pallets and then packing the loaded pallets into a truck. When generating the packing plan, planning engine 202 may identify one or more constraints that limit the location of the products on the pallets and the pallets in the truck based on, for example, the size, weight, and fragility of the products and weight and height restrictions for the truck and pallets. For example, if too much weight is placed on the back of a truck, the distribution of weight may cause the truck to tilt or handle unsafely. Additionally, when stacking products on a pallet, heavier items may need to be placed near the bottom of the pallet and lighter items may need to be placed near the top. Although particular constraints for exemplary packing areas and objects have been described, embodiments contemplate any number or type of constraints, according to particular needs.

According to embodiments, instruction engine 204 of warehouse management system 110 receives packing plan and/or picklist from planning engine 202 and based, at least in part on the picklist and/or the packing plan, instruction engine 204 generates instructions. Instructions may comprise an ordered sequence of actions for placing objects in a packing area according to a packing plan. According to embodiments, instruction engine 204 generates directions which may comprise, for example, a written or spoken description of handling procedures needed to place the items according to the packing plan, including, for example, each object's orientation, placement order, stacking height, and the like. Directions may be displayed visually as text on one or more displays 124 of one or more instruction rendering devices 120 or communicated as auditory instructions thorough audio output 125 of one or more instruction rendering devices 120.

Interface engine 206 of warehouse management system 110 may generate an interface, such as a GUI, comprising one or more interactive elements for selecting and configuring packing strategies. According to embodiments, interface engine 206 communicates with one or more instruction rendering devices 120 to display one or more visual elements and one or more interactive elements on one or more displays 124. The one or more visual elements may comprise text, graphics, or shading that convey information through visual cues. For example, the one or more visual elements may comprise an outline indicating the boundaries of the packing area. For example, when the packing area is the top surface of a pallet, interface engine 206 may display an outline comprising a visually distinctive line that traces the perimeter of the top surface of the pallet and indicates that the areas within the outline comprise the packing area. Similarly, as discussed in more detail below, visual elements may also comprise images of one or more items, packages, or containers that are displayed within the packing area to indicate the location where the items, packages, or containers are to be placed.

Additionally, interface engine 206 comprises one or more interactive elements. The one or more interactive elements may be organized into a menu or dashboard that is displayed to a user and provides for initiating an action in response to a user selection. For example, as discussed in more detail below, one or instruction rendering devices 120 displays a menu generated by interface engine and which allows selection of a packing strategy to be used for the packing area displayed. In response to a user selection of an interactive element (such as a menu choice), the interface engine 206 configures warehouse management system 110 to generate a packing plan and packing instructions based on the selected packing strategy.

According to an embodiment, transmitter 208 receives the output of instruction engine 204 and transmits it from warehouse management system 110 to one or more instruction rendering devices 120 using communication link 230.

Although server 112 is shown and described as comprising a single generation engine, a single planning engine, a single instruction engine, a single interface engine, and a single transmitter 206, embodiments contemplate any suitable number or combination of these located at one or more locations, local to, or remote from warehouse management system 110, such as on multiple servers or computers at any location in supply chain network 100.

Database 114 of warehouse management system 110 may comprise one or more databases or other data storage arrangement at one or more locations, local to, or remote from, server 112. Database 114 comprises, for example, item data 210, package parameters 212, container parameters 214, inventory data 216, inventory policies 218, picklist data 220, packing plans data 222, and instruction data 224. Although, database 114 is shown and described as comprising item data 210, package parameters 212, container parameters 214, inventory data 216, inventory policies 218, picklist data 220, packing plans data 222, and instruction data 224, embodiments contemplate any suitable number or combination of these, located at one or more locations, local to, or remote from, warehouse management system 110 according to particular needs.

Item data 210 of database 114 may comprise one or more data structures for identifying, classifying, and storing data associated with items, including, for example, a product identifier (such as a Stock Keeping Unit (SKU), Universal Product Code (UPC) or the like), product attributes and attribute values, a product image, sourcing information, and the like. Item data 210 may comprise data about one or more items organized and sortable by, for example, product attributes, attribute values, product identification, sales quantity, demand forecast, or any stored category or dimension. Attributes of one or more items may be, for example, any categorical characteristic or quality of an item, and an attribute value may be a specific value or identity for the one or more items according to the categorical characteristic or quality, including, for example, physical parameters (such as, for example, size, weight, dimensions, and the like) and special handling instructions (such as, for example, fragility, proper orientation, permitted or prohibited modes of shipment, and permitted or prohibited items that may be shipped together.)

As an example only and not by way of limitation, an item (such as, for example, a shirt) may comprise the attributes of gender, season, article of clothing, color, sleeve-length, price segment, pattern, or the like. Attribute values for these attributes may comprise, for example, male or female, for gender; spring, summer, fall, winter, for season; top, blouse, shirt, bottom, pants, shorts, skirt, or the like, for article of clothing; red, blue, green, or the like, for color; long, short, medium, or the like, for sleeve-length; good, better, best, for price segment; stripe, checked, plain, or the like, for pattern. Although particular items comprising particular attributes and attribute values are described herein, embodiments contemplate any item, attribute, or attribute value, accordingly to particular needs.

Package parameters 212 of database 114 may comprise one or more attributes of packages, including, for example, physical parameters (such as, for example, size, weight, and dimensions) and restrictions (such as, for example, crushability, maximum stacking height, permitted or prohibited modes of shipment, and permitted or prohibited items that may be placed in the package.) According to embodiments, a package comprises any object containing one or more items, including, for example, a box, a carton, and the like. One or more items may be placed inside one or more packages, and the one or more packages may be placed inside one or more containers.

Container parameters 214 of database 114 may comprise one or more attributes of containers, including, for example, physical parameters (such as, for example, size, weight, and dimensions) and restrictions (such as, for example, crushability, maximum stacking height, permitted or prohibited modes of shipment, and permitted or prohibited packages that may be placed in the container.)

Although embodiments of warehouse management system 110 are explained in relation to packing packages on pallets, embodiments contemplate warehouse management system 110 generating picklists, packing plans, and instructions for moving any object (including, for example, items, packages, and containers) onto any packing surface or into any packing volume. For example, warehouse management system 110 may generate picklists, packing plans, and instructions for packing items, packages, or containers into a box, shipping container, transportation vehicle 156, or onto a shelf, pallet, staging area, designated location, or the like. According to some embodiments, an object may simultaneously act as more than one of an item, package, or container, according to particular needs. For example, an object may be a container for receiving one or more packages, in one instance, an item for packing into one or more packages, in a second instance, and/or a package for receiving one or more items, in another instance. For example, a pallet may be a container for receiving one or more packages and simultaneously be a package for packing onto a truck.

Inventory data 216 of database 114 may comprise any data relating to current or projected inventory quantities or states. For example, inventory data 216 may comprise the current level of inventory for items at one or more stocking points across supply chain network 100. In addition, inventory data 216 may comprise order rules that describe one or more rules or limits on setting an inventory policy, including, but not limited to, a minimum order quantity, a maximum order quantity, a discount, a step-size order quantity, and batch quantity rules. According to some embodiments, warehouse management system 110 accesses and stores inventory data 216 in database 114, which may be used by warehouse management system 110 to place orders, set inventory levels at one or more stocking points, initiate manufacturing of one or more components, or the like. In addition, or as an alternative, inventory data 216 may be updated by receiving current item quantities, mappings, or locations from one or more instruction rendering devices 120, one or more communication devices 130, inventory system 140 and/or transportation system 150.

Inventory policies 218 of database 114 comprise constraints and rules for determining a minimum and maximum quantity of items to be stored in inventory and the quantity and timing of orders to replenish the inventory. Inventory policies may be based on, for example, target service level, demand, cost, fill rate, and the like. Inventory policies 218 based on target service levels may ensure one or more supply chain entities 160 meets a service level with a certain probability. For example, one or more supply chain entities 160 may set a service level at 95%, meaning one or more supply chain entities 160 will set the desired inventory stock at a level that meets demand 95% of the time. Although, a particular service level target and percentage is described, embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. According to embodiments, in response to setting a service level for one or more inventory items, warehouse management system 110 may automatically generate a replenishment order according to one or more replenishment rules, and generate a picklist, packing plan, and/or packing instructions for items to fulfill the replenishment order and replace the depleted inventory according to the service level.

Picklists data 220 of database 114 may store one or more picklists comprising a list of products, boxes, containers, packages, pallets, items, or any object that is picked to be placed in a shipment, including, for example, placing items or packages on a pallet, placing pallets in a container or truck, placing items in a truck, trailer, warehouse, or packing area. The picklist may be transmitted to a mover that locates and picks the items and transports the items to a staging area.

Packing plans data 222 of database 114 may store one or more packing plans comprising a configuration for placing objects within a packing area in preparation for a shipment. Packing plans may comprise any suitable way to pack objects inside a packing area and may be based, at least in part, on item data 210, package parameters 212, container parameters 214, inventory data 216, inventory policies 218, and picklist data 220. For example, planning engine 202 may receive a picklist from generation engine 200 and generate one or more packing plans based on the identity, shipping destination, and characteristics of the items that are on the picklist and the identity, shipping destination, and characteristics of the package or container where the items will be placed, such as a pallet, shipping container, box, and the like.

Instructions data 224 of database 114 may store a set of one or more instructions comprising an ordered sequence of actions for placing objects in a packing area according to the packing plan. According to embodiments, instructions may also include directions which may comprise, for example, a written or spoken description of handling procedures needed to place the items according to the packing plan, including, for example, each object's orientation, placement order, stacking height, and the like. Directions may be displayed visually as text on one or more displays 124 of one or more instruction rendering devices 120 or communicated as auditory instructions thorough audio output 125 of instruction rendering devices. According to embodiments, instructions include training instructions for teaching various packing strategies, such as, for example, a Ti-Hi model. According to embodiments, a Ti-Hi model comprises a particular packing strategy that is based on properly packing a number of items (or packages) in each layer (or tie) and properly packing each layer into a number of stacks (or high).

As described more fully below and according to embodiments, warehouse management system 110 provides a visualization of instructions to pack a set of containers onto a pallet through one or more instruction rendering devices 120.

Figure 3:
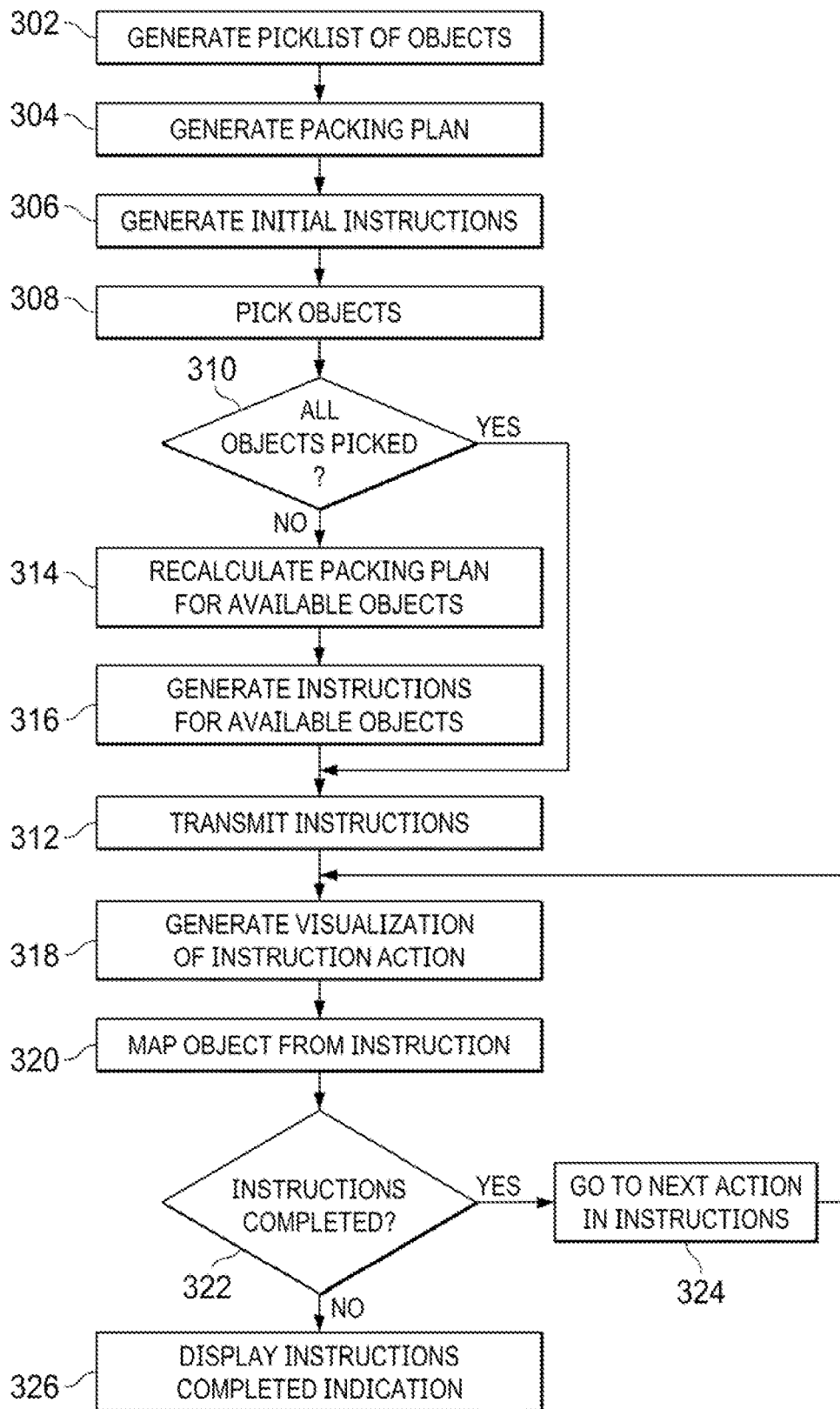
FIG. 3 illustrates an exemplary method of packing objects for shipment, according to an embodiment.

FIG. 3 illustrates exemplary method 300 of packing objects for shipment, according to an embodiment. Although the actions of method 300 are described in a particular order, one or more actions may be performed in one or more combinations or permutations according to particular needs. At action 302, generation engine 200 may generate one or more picklists. As explained above, generation engine 200 of warehouse management system 110 receives an order and produces a picklist comprising objects that are picked to be placed in a shipment. For example, the picklist may comprise a set of items, packages, or containers that are needed to prepare a shipment. In some instances, a picklist may comprise a set of items that are needed to replenish the inventory at one or more supply chain entities 160. Additionally, embodiments contemplate a picklist including a set of packages for sorting and holding the items during shipment and/or a set of containers needed to secure or hold packages. For example, in one instance a picklist may identify a set of items at a warehouse that will be packed on a pallet which will be transmitted by transportation vehicle 156 to one or more supply chain entities 160.

At action 304, planning engine 202 generates a packing plan based at least in part, on a packing area and the objects identified on the generated picklist. According to embodiments, planning engine 202 determines a packing plan for the objects on the picklist based on the characteristics of the objects, shipping requirements, and a selected packing area. According to embodiments, planning engine 202 may generate a packing plan by first selecting a packing area based on available choices consistent with the objects on the picklist or using a preselected packing area. For example, planning engine 202 may calculate the number of pallets or boxes needed to ship one or more items for a replenishment order and generate a packing plan based, at least in part, on the packing area available in the pallets or boxes. After the packing area is determined, planning engine 202 may generate a packing plan comprising a configuration of objects placed within the packing area that represents a proper packing configuration of the objects. As discussed herein, embodiments of the warehouse management system 110 allow selecting from various packing strategies or patterns. The generated packing plan may comprise a different configuration of objects in the packing area depending on the selected packing strategy or pattern, any of which may be a proper packing configuration of the objects, according to particular needs.

At action 306, instruction engine 204 generates initial packing instructions for the packing area. Based, at least in part, on the picklist and/or the packing plan, instruction engine 204 generates instructions to place the objects according to the packing plan, including a stacking orientation, order of object placement, maximum placement height, and other information for packing objects.

At action 308, a mover may pick objects and transport them to a staging area in preparation for packing. According to embodiments, a mover picks objects and transports them to a staging area based, at least in part, on one or more of the picklist, packing plan, and instructions. For example, the picklist may be generated by generation engine 200 and electronically communicated to one or more automated warehousing systems 167 that, in response to receiving the generated picklist, automatically locate and move the items on the picklist from a storage area, such as storage racks, to a staging area, comprising an area of the warehouse where objects may be packed in preparation for shipment.

At action 310, a determination is made whether all the objects were picked. If all objects have been picked, method 300 continues to action 312 and transmitter 208 transmits the packing instructions to the instruction rendering device. For example, in response a mover indicating that all objects in a picklist have been transported to a staging area, transmitter 208 transmits the instructions received from instruction engine 204 to one or more instruction rendering devices 120. However, returning to action 310, if a determination is made that all objects have not been picked, method 300 may continue to action 314 and planning engine 202 may recalculate the packing plan using only the available objects and excluding any missing or unavailable objects. For example, while picking and transporting objects from a picklist to a staging area, a mover may identify that one or more of the objects are missing, broken, or still waiting to be transported. This may include a mover identifying several items that come from the other side of a factory have not arrived to the staging area. In response, a mover may flag the unavailable items as missing. In response to receiving an indication that one or more items are flagged, warehouse management system 110 may send an updated picklist identifying available objects and/or unbailable objects to the packing planner 202 to recalculate the packing plan using only the available items.

At action 316, instruction engine 204 may then regenerate instructions for the available objects based, at least in part, on the recalculated packing plan. According to embodiments, warehouse management system 110 responds to flagged objects by recalculating a packing plan and regenerating instructions using the available objects. In addition to receiving an indication of unavailable objects, embodiments contemplate warehouse management system 110 receiving other issues flagged by a user as well. By example and not by way of limitation, issues to be flagged may include, for example, that there are not enough items to be packed, that the items are not in the right location, that the items are out of stock, that the assortment of items does not work for the particular shipment, or like issues. Although a number of issues have been described, embodiments contemplate warehouse management system 110 receiving flagged issues for other types of issues, according to particular needs.

After all objects have been picked and transported to the staging area, method 300 continues to action 312 and the regenerated instructions may then be communicated to one or more instruction rendering devices 120.

At action 318, one or more instruction rendering devices 120 may receive the instructions for packing the available objects in the staging area and display the instructions to a user. According to embodiments, instruction rendering device 120 renders the instructions as one or more visual elements displayed to a user on an augmented reality visualization to indicate, for example, the packing area, an object to be placed in the packing area, and/or directions for packing the packing area according to the instructions.

At action 320, one or more sensors 123 of the one or more instruction rendering devices 120 maps the location of an object identified in the instructions to be packed in the packing area. According to embodiments, the mapping of the object identifies the location and orientation of the object relative to one or more other objects and/or the packing area. Based on the mapping, instruction rendering device 120 may display feedback to guide a user to place the object in a location identified for the object in the instructions and identify when the object is correctly placed and oriented in the packing area indicated by the instructions.

In response to an indication that the object is correctly placed in the packing area according to the instructions, method 300 continues to action 322 where a determination is made if one or more actions are needed to complete the instructions. According to embodiments, instruction rendering device 120 identifies if the instructions require further actions or have been completed.

If the instructions comprise a further action to complete packing the objects, method 300 continues to action 324 and one or more instruction rendering devices 120 identifies the next action in the instructions and returns to action 318, where one or more instruction rendering devices 120 displays visual elements representing further actions of the instructions to the user. Actions 318-324 may repeat as many times as necessary until the instructions require no further actions set and/or all objects are packed according to the packing plan.

When all actions from the instructions are completed, method 300 continues to action 324 and one or more instruction rendering devices 120 may display an indication that the instructions are completed. By way of further explanation, an example of packing boxes onto a pallet using an exemplary instruction rendering device is now given.

As discussed above, warehouse management system 110 may generate a picklist of objects that will be packed in a packing area for transport to, for example, replenish the inventory of one or more supply chain entities 150 based on, for example, current inventory levels and/or one or more inventory policies. As discussed above, packing area may comprise any suitable surface or volume of a package or container (including, for example, a top surface of a pallet, a bed of a transport trailer, an interior of a box, and the like) and may be selected based on, for example, meeting requirements necessary for attributes of the objects on the picklist. For example, a packing area may be selected based on the size of the selected objects and the size of the packing area. According to embodiments, warehouse management system 110 and/or instruction rendering device 120 calculate the size of objects and packing areas to select one or more packages or containers suitable for packing items on the picklist. By way of further explanation, an example, comprising a shipping pallet, is now given.

Figure 4:
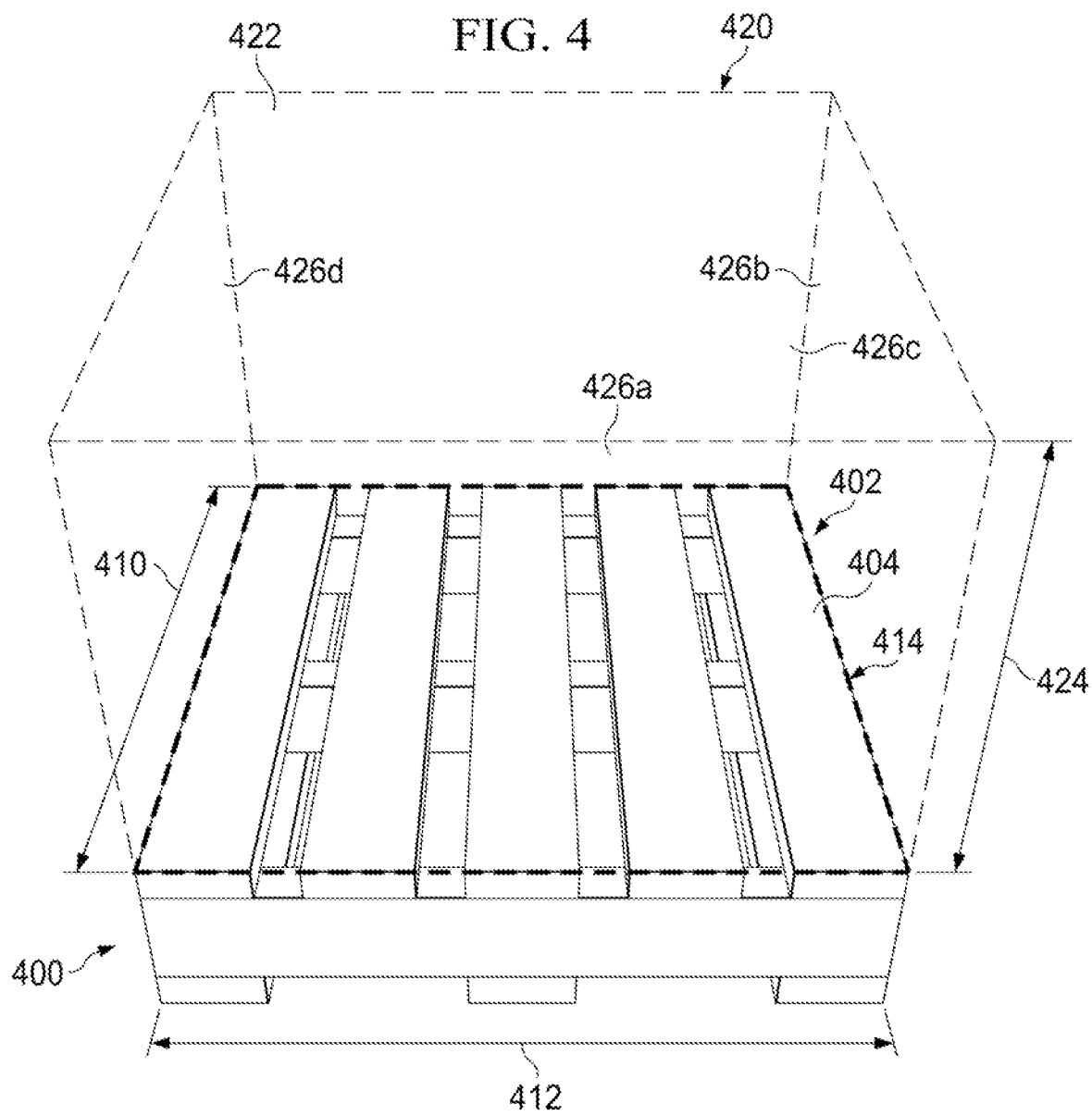
FIG. 4 illustrates a calculated packing area of a pallet, according to an embodiment.

FIG. 4 illustrates a calculated packing area of a pallet, according to an embodiment. To select a packing area, warehouse management system 110 and/or one or more instruction rendering devices 120 may calculate physical characteristics, including sizes, of one or more objects and/or packing areas, such as the exemplary empty pallet 400. According to embodiments, the dimensions or size of pallet packing area 402 in the visual field may be calculated using one or more sensors 123 of one or more instruction rendering devices 120 and planning engine 202. Additionally, or in the alternative, the dimensions of a packing area may be retrieved from one or more storage locations at one or more databases in supply chain network 100.

Pallet 400 comprises a pallet packing area 402 defined by pallet top surface 404 having width 410 and length 412 and a pallet packing area perimeter 414. According to embodiments, pallet packing area perimeter 414 may be represented by a visual element displayed by one or more instruction rendering devices 120 and defines the edges of the pallet packing area 402, the area within which objects may be packed. Pallet packing perimeter 414 may be determined by extending a plane approximately aligned along pallet top surface 404 to the edges of pallet 400 and excluding any margins around pallet top surface 404 where objects should not be placed and including any overhang areas that extend beyond pallet top surface 404 where portions of one or more objects may be permitted to extend when packed on pallet 400. Additionally, or in the alternative, the packing area of empty pallet 400 may comprise a three-dimensional pallet packing volume 420 defining a volume inside of which objects are to be placed for packing on the pallet. According to embodiments, pallet packing volume 420 comprises a base comprising pallet top surface 404, an upper surface 422 at packing height 424, and one or more outer surfaces 426a-426d that extend from pallet packing perimeter 414 to packing height 424, which along with pallet top surface 404, define a volume inside of which objects are to be placed for packing on the pallet. Although pallet packing area 402 is illustrated as a rectangular surface defined by pallet packing perimeter 414 or the rectangular box defined by pallet packing volume 420, embodiments contemplate a suitable packing area of any two- or three-dimensional shape, according to particular needs.

After the dimensions of the packing area are determined, warehouse management system 110 and/or instruction rendering devices 120 may generate a packing plan comprising a configuration of one or more objects to place within the packing area determined by one or more packing patterns. According to embodiments, warehouse management system 120 comprises a user interface providing for selecting various packing patterns when generating a packing plan and/or packing instructions.

Figure 5:
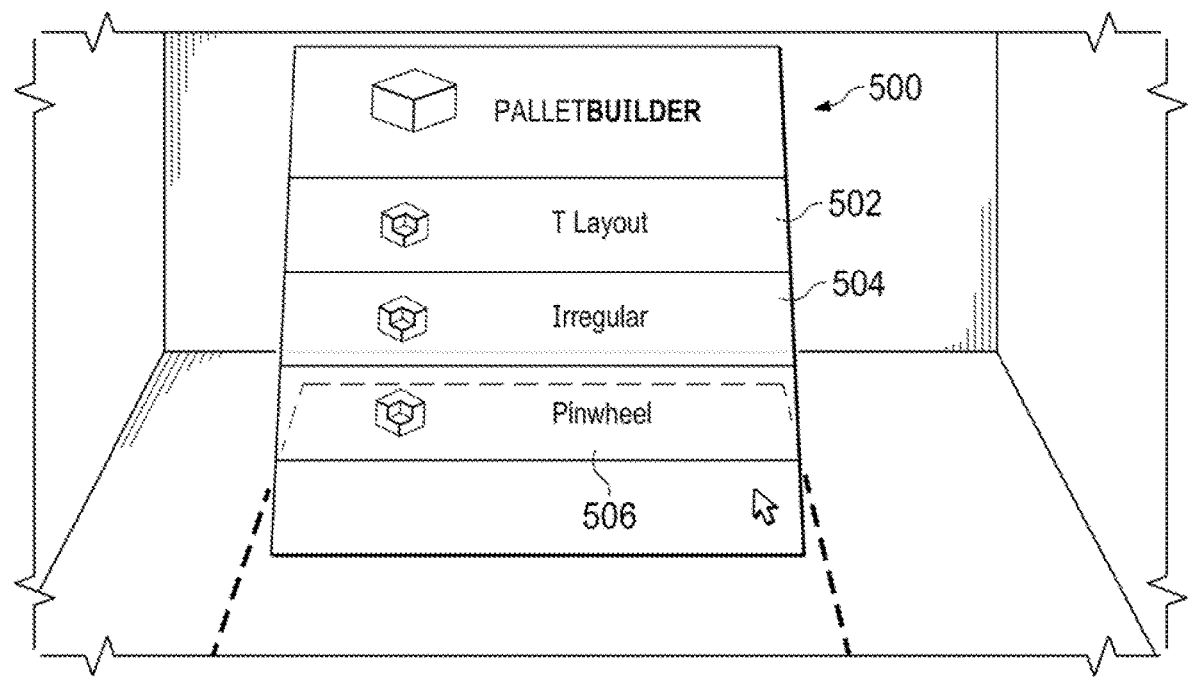
FIG. 5 illustrates an exemplary interface for selecting one or more packing patterns, according to an embodiment.

FIG. 5 illustrates an exemplary interface for selecting one or more packing patterns, according to an embodiment. According to embodiments, one or more instruction rendering devices 120 displays an exemplary interface for configuration of picklists, packing plans, or instructions, flagging an issue, and/or selecting a particular packing pattern. Menu 500 comprises three selectable elements comprising selectable menu options 502-506 for three different packing patterns that, in response to a user selection, generates a packing plan and/or instructions for a set of objects based on the selected packing pattern. As an example only and not by way of limitation, in response to a user selection of first selectable menu option 502, a packing configuration is generated according to a T Layout packing pattern. Selection of second selectable menu option 504 generates a packing configuration according to an irregular packing pattern. Similarly, selection of third selectable menu option 506 generates a packing configuration menu using a pinwheel packing pattern. According to some embodiments, the displayed group of selectable menu options 502-506 comprise packing patterns that are predetermined based on the group of objects to be packed and the type and/or shape of the packing area including, for example, the size, weight, crushability, required orientation, and/or other attributes of the objects such that the predetermined packing patterns generate a configuration with structured layers and stacks suitable for the objects and packing area to be packed. Although particular packing patterns are shown and described, embodiments contemplate any suitable packing patterns, according to particular needs.

In response to selecting a packing pattern from menu 500, warehouse management system 110 generates a packing plan for packing a group of objects in a packing area according to the selected packing pattern. The packing plan is used to generate packing instructions which may be transmitted to one or more instruction rendering devices 120 which renders and displays visual elements comprising representations of objects aligned with the packing area and indicating where in the packing area the objects are to be placed. According to embodiments, representations of objects may comprise, for example, a translucent shape displayed to appear in the approximate size, shape, and orientation of the object and in a location within the packing area where the object is to be packed. Additionally, instructions may comprise directions, feedback, and other visual elements, as described in more detail below.

Figure 6:
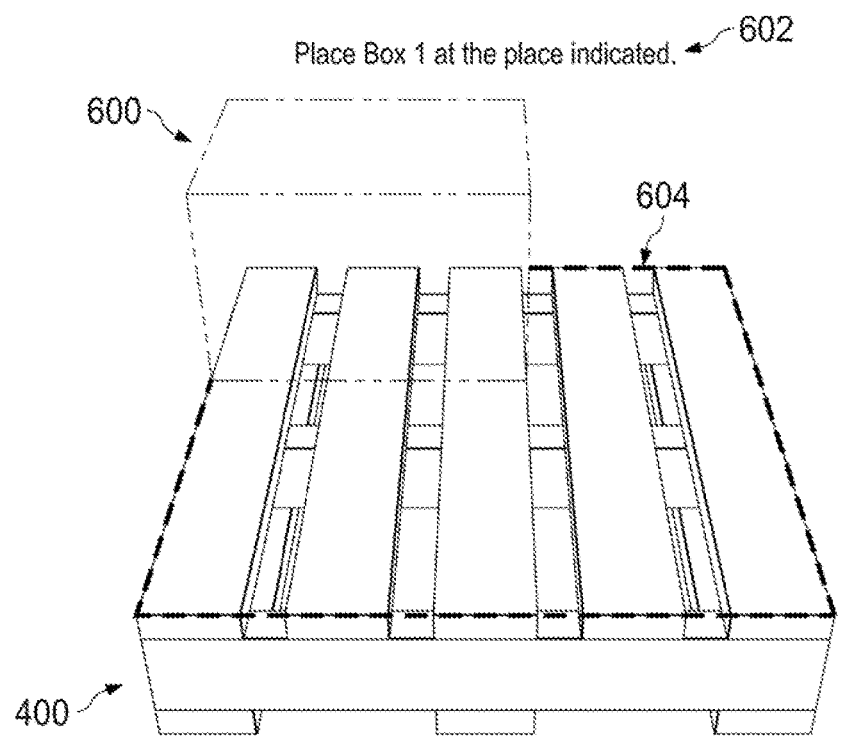
FIG. 6 illustrates an exemplary visualization of instructions for packing the pallet of FIG. 4, according to an embodiment.

FIG. 6 illustrates an exemplary visualization of instructions for packing pallet 400 of FIG. 4, according to an embodiment. As discussed above, one or more instruction rendering devices 120 represent objects to be packed using one or more visual elements that may indicate where in the packing area the object is to be placed. Visual elements for representing the instructions may comprise object visualization 600, directions 602, and packing area boundary 604. For example, a package comprising a box of items to be placed on pallet 400 may be represented by object visualization 600 comprising a translucent shape representing the approximate size, shape, and/or orientation of the box. According to embodiments, the size, shape, and/or orientation of the object represented by box visualization 600 is calculated using one or more sensors 123 of one or more instruction rendering devices 120 and planning engine 202. Additionally, or in the alternative, the size, shape, and/or proper orientation of the object represented by box visualization 600 is retrieved from one or more databases in supply chain network 100. Although box visualization 600 comprises a translucent box representing a rectangular-shaped box object to be placed for packing, embodiments contemplate representing any item, package, or container using any translucent or opaque two- or -three dimensional visual element, which may be shaped to represent, for example, the physical appearance the object, a simplified graphic or icon that identifies the object, an outline or contour of the object, or a two-dimensional projection of the object.

Directions 602 comprise visual elements displayed by one or more instruction rendering devices 120 to indicate actions to be taken to place one or more objects according to the instructions. For example, directions 602 may comprise text indicating to place an object at a particular position, such as, "Place Box 1 at the place indicated." Although particular directions are illustrated, embodiments contemplate any suitable directions according to particular needs.

Additionally, one or more instruction rendering devices 120 may display packing area boundary 604. Packing area boundary may be represented by an outlined shape indicating an area within the shape where objects should be packed and an area outside of the shape where objects should not be packed. According to embodiments, packing area boundary 604 may be represented by a contour of a packing area perimeter or edges of a packing area volume, such as, for example, the pallet packing area perimeter 414 or pallet packing volume 420.

According to embodiments, one or more instruction rendering devices 120 may also display one or more visual elements representing additional information associated with the packing area or objects to be packed including, for example, visual elements identifying one or more items on a picklist, indicating whether one or more items have already been picked, identifying packages or containers needed for packing the one or more items, indicating whether the package or containers are in a staging area, or other like information.

While displaying object visualization 600, one or more instruction rendering devices 120 may use one or more sensors 123 to detect the object represented by object visualization 600, map the location and orientation of the object, and detect if the location and orientation of the object corresponds to the proper location and orientation indicated in the packing plan and/or instructions. Additionally, as discussed above, although in this example, one or more sensors 123 are described in connection with one or more instruction rendering devices 120, one or more sensors 123 may comprise remotely located sensors, including sensors of one or more other devices, that are communicatively coupled to transmit and/or receive data from one or more instruction rendering devices 120. These may include one or more imaging sensors of one or more cameras located around a packing area or staging area that transmit data to one or more warehouse systems 110 and/or one or more instruction rendering devices 120 to, for example, map and size one or more objects or packing areas, generate visualizations representing the objects, and detect when an object is located and oriented according to the packing plan or instructions.

According to embodiments, warehouse management system 110 and/or one or more instruction rendering devices 120 may use sensors 123 to continuously or repeatedly monitor objects, packing area, physical objects, and/or one or more instruction rendering devices 120 so that when one or more objects, packing areas, physical objects, and/or instruction rendering devices 120 move, any of the one or more visual elements that are aligned with one or more physical objects will continue to be properly aligned. For example, object visualization 600 and packing area boundary 604 are mapped to the physical environment, such that the three-dimensional representation of the box and the contour delineating the extent of the packing area will be in the same spot in relation to pallet 400 regardless where instruction rendering device 120 is located or positioned. If pallet 400 is moved, object visualization 600 and packing area boundary 602 will continue to be properly aligned with pallet 400 and displayed to move along with the new location and orientation of pallet 400.

Continuing with the example for packing pallet 400, when the object represented by object visualization 600 is detected by sensors 123, one or more instruction rendering devices 120 may monitor to map the location and orientation of the object.

Figure 7:
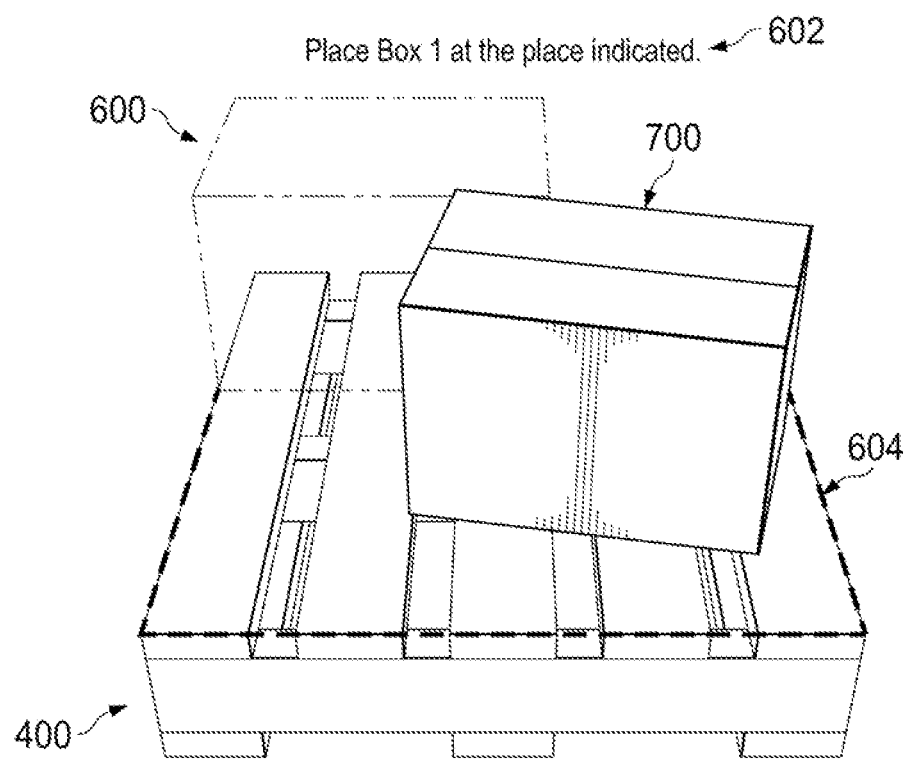
FIG. 7 illustrates an exemplary visualization of instructions for packing a first object on the pallet of FIG. 4, according to an embodiment.

FIG. 7 illustrates an exemplary visualization of instructions for packing first object 700 on pallet 400 of FIG. 4, according to an embodiment. First object 700 comprises the box represented by object visualization 600. Although first object 700 is illustrated and described as a box, an object may comprise any item, package, or container, of any suitable size or shape for packing into a packing area, according to particular needs. As discussed above, directions 602 indicate that first object 700 should be placed within packing area boundary 604 in the same location and orientation as the three-dimensional box of object visualization 600. In response to detecting movement of first object 700, one or more instruction rendering devices may update one or more visual elements based on the new detected location.

Figure 8:
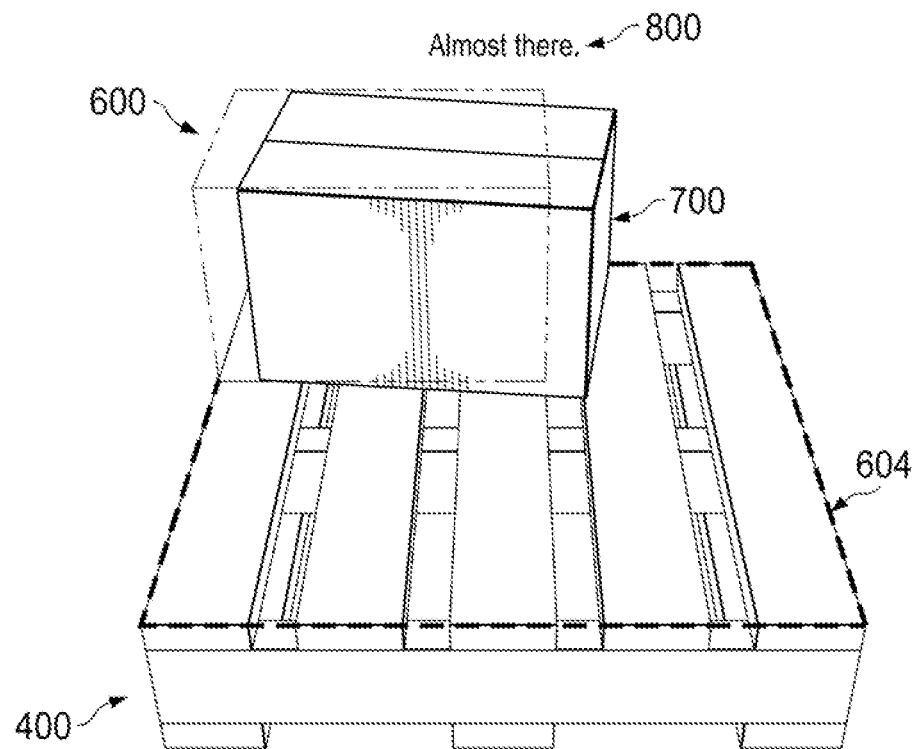
FIG. 8 illustrates an exemplary visualization of feedback for placing the first object on the pallet of FIG. 4, according to an embodiment.

FIG. 8 illustrates an exemplary visualization of feedback for placing first object 700 on pallet 400 of FIG. 4, according to an embodiment. As stated above, object visualization 600 is displayed to align with pallet 400 even during movement of one or more instruction rendering devices 120. As a user moves around pallet 400 to place first object 700, object visualization 700 may be continually updated and displayed to indicate where first object 700 should be placed on the packing area of pallet 400. Additionally, when movement of object 700 is detected in relation to object visualization 600, one or more instruction rendering devices 120 may generate feedback 800. Feedback may comprise one or more visual elements, including but not limited to color, symbols, or text, displayed on display 124 and one or more auditory elements, including, but not limited to speech and sounds, produced by audio output 125, identifying completion or incompletion of an instruction and/or the degree to which the instruction has not been completed. For example, when a user moves first object 700 toward object visualization 600, feedback visualization 800 may be displayed by one or more instruction rendering devices 120 indicating the alignment of first object 700 with object visualization 600. In the illustrated embodiment, feedback visualization 800 comprises text stating "almost there," which indicates the alignment of first object 700 is not correctly aligned with object visualization 600 but is close to the correct alignment. Additionally, object visualization 600 may be altered to represent feedback. In the illustrated embodiment, object visualization 600 may be updated from a first color to one or more additional colors representing the degree of alignment. For example, prior to detection of first object 700, object visualization may comprise a first color indicating that the first object 700 has not been detected by sensors 123 or is not near or inside the packing area. Upon detection of first object 700 near or inside packing area, object visualization 600 may be altered to comprise a second color indicating that first object is near or inside the packing area. As first object 700 is moved closer to object visualization 600, the color of object visualization 600 may be updated to one or more additional colors indicating the degree of alignment with the location and position of object visualization 600. Additionally, when sensors 123 detect that first object 700 is correctly aligned with object visualization 600, one or more instruction rendering devices 120 may update feedback to indicate that first object 700 is correctly packed.

Figure 9:
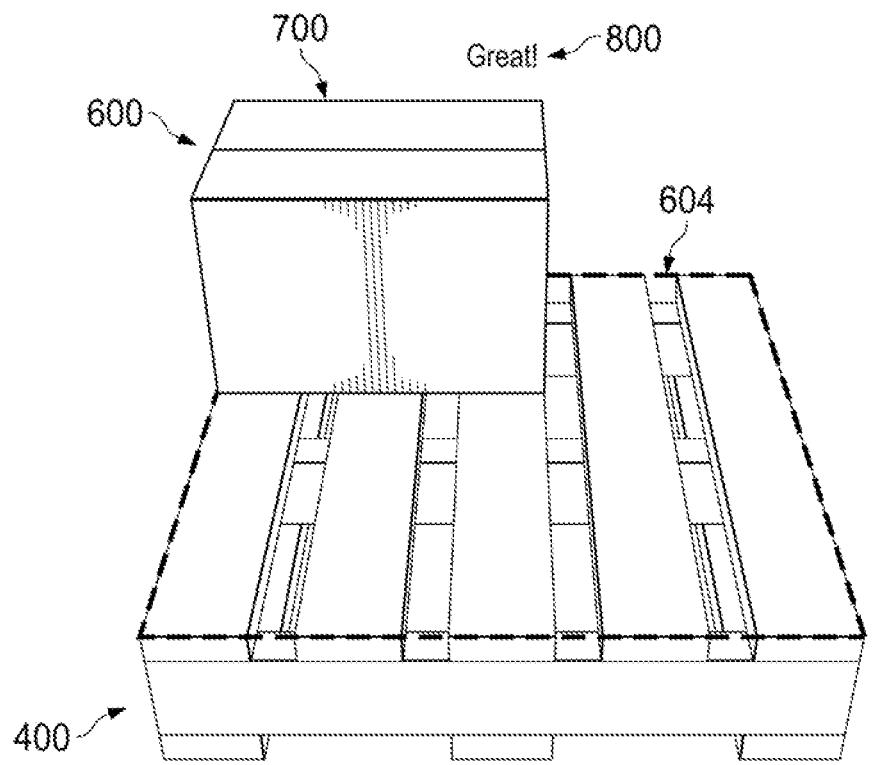
FIG. 9 illustrates an exemplary visualization of feedback for correctly packing the first item on the pallet of FIG. 4, according to an embodiment.

FIG. 9 illustrates an exemplary visualization of feedback for correctly packing first item 700 on pallet 400 of FIG. 4, according to an embodiment. In response to detecting that first object 700 is correctly aligned to the location and position indicated by object visualization 600, one or more instruction rendering devices 120 may display visual elements or generate auditory elements indicating that first object 700 is correctly packed. For example, feedback visualization 800 may comprise text indicating that first object 700 is correctly aligned, such as, for example, displaying text stating "Great!" In addition, the color of object visualization 600 may be altered to a color selected to indicate that the item represented by object visualization 600 has been correctly packed.

Although feedback is illustrated as particular text and colors indicating a degree of alignment between first object 700 and object visualization 600, embodiments contemplate any type or representation of feedback indicating any suitable visual or auditory element that indicates changes to or among one or more objects, packing areas, and/or physical objects according to particular needs and including, for example, changes in location and orientation among one or more objects, changes in availability of one or more items, updates to statuses of qualities of items to be packed, detection and resolution of issues, and the like.

After first object 700 is correctly placed, one or more instruction rendering devices 120 continues to a further action of the generated packing instructions and renders the further action of the instructions by displaying one or more visual elements and/or generating one or more auditory elements representing the further action.

Figure 10:
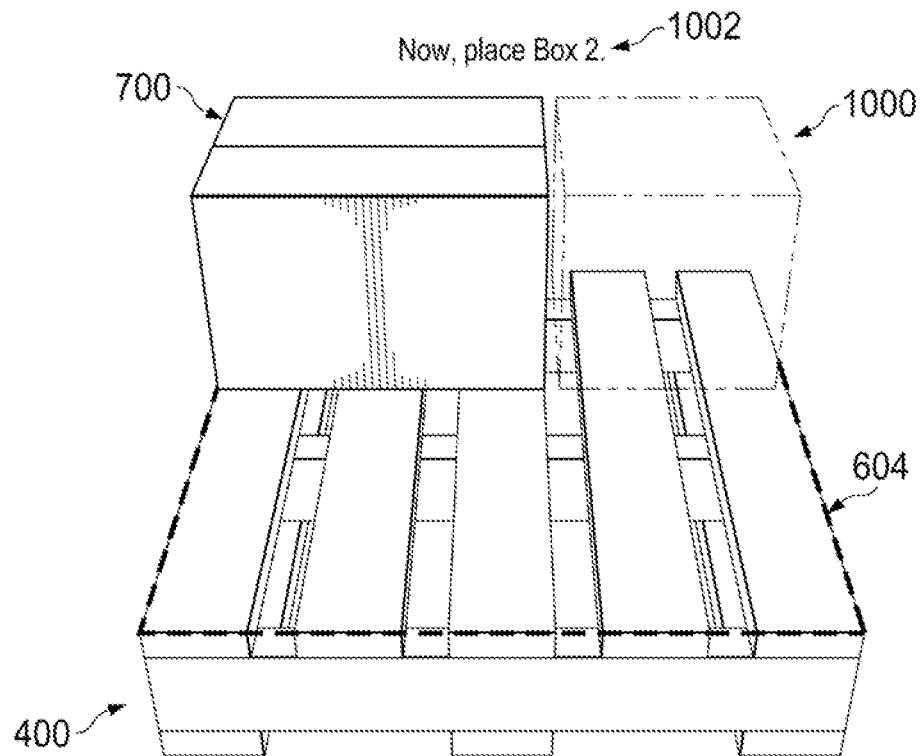
FIG. 10 illustrates an exemplary visualization of instructions for packing a second object, according to an embodiment.

FIG. 10 illustrates an exemplary visualization of instructions for packing a second object, according to an embodiment. After detecting that first object 700 is correctly placed, one or more instruction rendering devices 120 removes object visualization 600 and displays second object visualization 1000 and updated directions 1002. Continuing with the example of packing pallet 400, based on the correct packing of first object 700, feedback is generated by removing object visualization 600 to indicate that first object 700 has been correctly packed and generating second object visualization 1000 comprising a three-dimensional shape aligned with pallet 400 and indicating the location and orientation where a second object should be packed. Additionally, updated directions 1002 comprising text stating "Now place Box 2," which indicates the second object is identified as "Box 2," and should be placed in the packing area.

As described above in relation to first object 700, one or more sensors 123 map the location and position of the second object and one or more instruction rendering devices 120 provide feedback indicating when the second object is correctly aligned with second object visualization 1000 and/or the degree to which the second object is not correctly aligned. After correct packing of the second object, one or more instruction rendering devices 120 may continue displaying visual elements and generating audio elements to represent instructions and feedback until all objects are correctly packed in the packing area. In response to correctly packing a last object on pallet 400, one or more instruction rendering devices 120 may display a visual element indicating that packing of pallet 400 is completed. Additionally, in response to detecting that packing of pallet 400 is completed, one or more instruction rendering devices 120 may transmit data indicating pallet 400 is completed and the identity and location of items on pallet 400 to one warehouse management system 110, one or more instruction rendering devices 120, one or more communication devices 130, inventory system 140, transportation network 150, one or more supply chain entities 160, and/or computer 170. In response to identifying pallet 400 as completed, warehouse management system 110 may generate a new picklist, packing plan, and instructions for pallet 400 and a packing area suitable for pallet 400 and any one or more objects on the new picklist. For example, the newly generated picklist may comprise pallet 400 and any one or more other pallets to be shipped in the same container as pallet. Based on the physical characteristics of the pallets, planning engine 202 may identify a packing area, such as a trailer, truck, ship, railcar, shipping container, or the like, and calculate a packing plan comprising a configuration for packing pallets in the packing area according to any constraints or restrictions associated with the pallets, objects packed on the pallets, maximum allowable travel time for the shipment, and other like factors. For example, as discussed above, transportation vehicles 156 often comprise restrictions on the location and distribution of weight in their packing area. Fully-packed pallets can be extremely heavy and therefore must be packed in a configuration that locates and distributes the weight of the pallets according to restrictions or constraints of the transportation vehicle 156. Additionally, packing planner may transmit the pallet packing plan to instruction engine 204 to generate instructions based on the pallet packing plan. Instruction engine 204 may then transmit the instructions to one or more instruction rendering devices 120 to render the instructions as visual and auditory elements configured to guide the correct packing of pallets according to the configuration calculated in the packing plan. Additionally or in the alternative, planning engine 202 may generate a loading plan for the pallets on the picklist and the identified packing area. The loading plan may comprise an order and location for loading the one or more pallets onto the packing area and may include one or more charts, illustrations, and the like.

Figure 11:
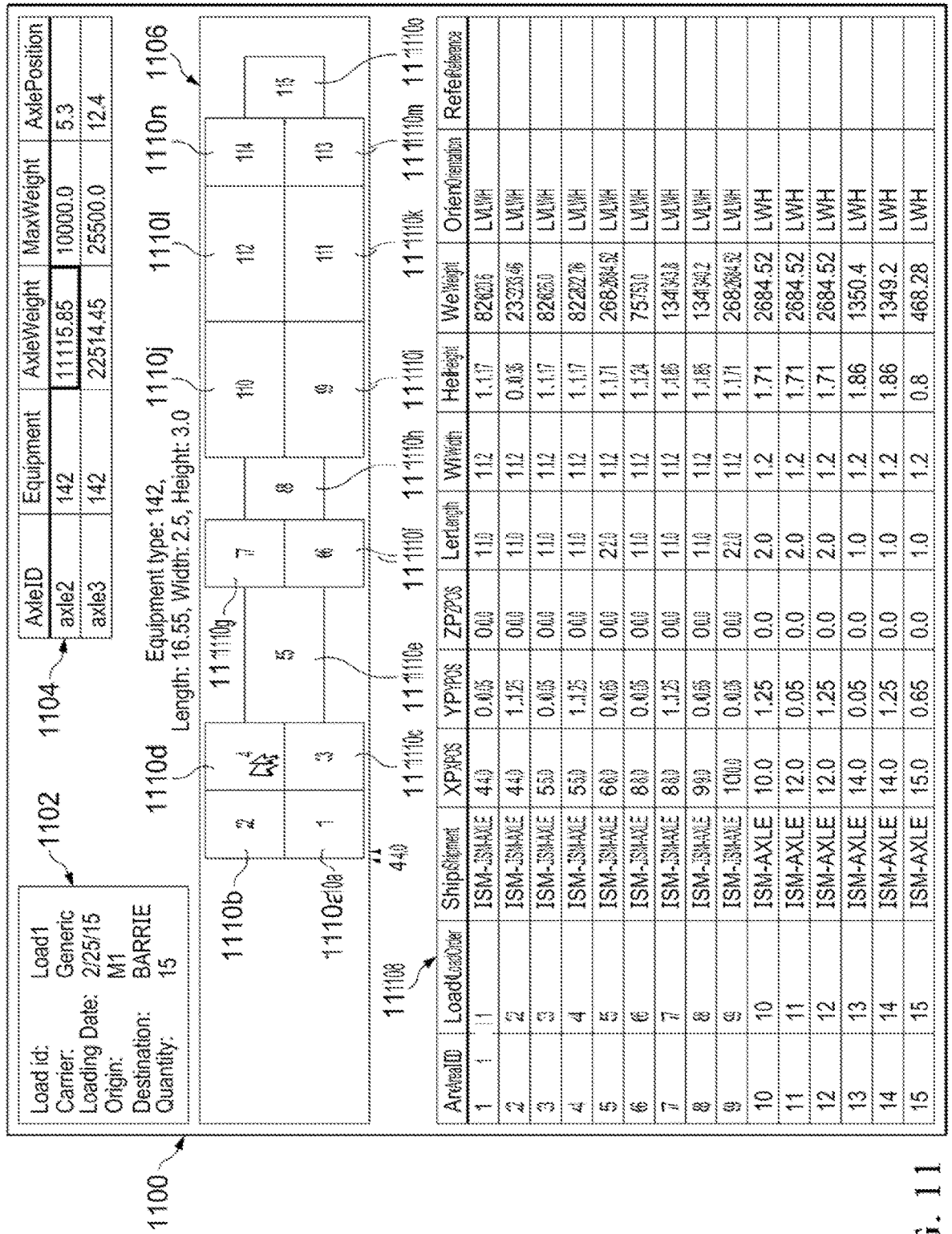
FIG. 11 illustrates exemplary loading plan 1100, according to an embodiment.

FIG. 11 illustrates exemplary loading plan 1100, according to an embodiment. According to embodiments, loading plan 1100 comprises load information 1102, restriction feedback 1104, loading configuration 1106, and object chart 1108. According to embodiments, warehouse management system 110 may set an orientation for loading objects, such as pallets packed with one or more items, in a truck or trailer using planning engine 202. Load information 1102 comprises data describing the identity of the load, the name of the carrier, date the load was loaded, the origin and destination of the load, and the quantity of objects in the load. Although a particular combination of load information is illustrated, embodiments contemplate any suitable information associated with the load, the objects in the load, and the like. Restriction feedback 1104 comprises a chart indicating whether one or more restrictions associated with the load are satisfied or exceeded. Although restriction feedback 1104 comprises a chart indicating restrictions comprising a maximum value, embodiments contemplate restriction feedback 1104 comprising any visual element representing any suitable restriction, including restrictions comprising a minimum value, a range or set of permissible values, a range or set of impermissible values, and the like. According to the illustrated example, restriction feedback 1104 indicates that transportation vehicle 156 has a maximum weight restriction at the second axel of 10,000 pounds and a maximum weight restriction at the third axel of 24400 pounds. Continuing with this example, restriction feedback 1104 identifies the predicted axle weight at each axle when the truck is loaded according to the arrangement illustrated in loading configuration 1106 and whether the predicted axle weight exceeds the restriction on maximum weight. In this example, the arrangement illustrated in loading configuration 1106 causes the maximum weight restriction for the second axle to be exceeded, which is indicated by a number indicating a predicted weight (11,115 pounds) that is greater than the maximum weight restriction and a visual element highlighting the excessive weight reading. According to embodiments, in response to a restriction not being met, planning engine 202 may calculate a new configuration of loaded objects and check that the restrictions are not exceeded. Loading configuration 1106 comprises a top-down view illustrating the layout for objects 1110a-1110o used to calculate restriction feedback 1104, as discussed above, and to calculate the data illustrated in object chart 1108. Object chart 1108 comprises identification, location, dimensions, weight, and orientation of objects 1110a-1110o based on the layout illustrated in loading configuration 1106 and may include, for example, coordinates indicating the current location of objects 1110a-1110o in the loading configuration 1106 (such as, for example, the x-position [XPOS], y-position [YPOS], z-position, [ZPOS]), and the length, width, weight, and orientation of objects 1110a-1110o. As illustrated, the orientation, lwh, indicates the order of the orientation is length (l), width (w), and height (h), and, accordingly, the XPOS is the length, the YPOS is the width, and the ZPOS is the height). Although particular descriptions are indicated in object chart 1108, embodiments contemplate any suitable combination of description information according to particular needs.

Although embodiments illustrate loading configuration 1106 as a two-dimensional visualization of an overhead layout of objects 1110a-1110o assigned to various positions within the packing area, embodiments contemplate any two-dimensional or three-dimensional visualization of a layout of comprising any number of objects assigned to various positions within one or more packing areas and displayed on, for example, a display of one or more communication devices 130 and/or one or more instruction rendering devices 120. For example, a three-dimensional visualization of loading configuration 1106 may comprise an augmented reality visualization illustrated from a first-person perspective illustrating what a user would see while packing items according to the loading plan. Continuing with this example, the visualization may update based on the user's field of vision, so that any displayed visual elements illustrating objects, pallets, feedback, and any other displayed visualizations are aligned with the loading area for the loading plan. Additionally, embodiments contemplate loading plan and the exemplary visualization updating automatically when, for example, a particular object, such as a pallet, is not available to illustrate new locations for any remaining pallets. By way of example and not of limitation, the truck illustrated in loading configuration 1106 comprises an opening for loading and removing pallets on only the back of the truck, which is the end of the loading configuration 1106 to the right of object 1110o. As can be seen from the size and location of the pallets, pallets placed to the left of the layout configuration may be difficult or impossible to remove without also removing some, if not all, of the pallets between the placed pallet and the door. Pallets placed last on the truck will be near the opening of the truck and easier to remove. In contrast, earlier-placed pallets may be blocked by later-placed pallets. Therefore, if certain pallets are not ready to be shipped and are included in the loading plan, the loading plan may update automatically based on the shipments that will need to be removed first, so that an early shipment is not stuck behind a later shipment.

In addition, although objects and packing areas are both described as rectangular or box-shaped objects, embodiments contemplate objects and packing areas comprising various different shapes. For example, round-objects may be placed rectangular packing areas or objects of various different shapes may be placed within the same container. By way of illustration an example is now given.

Figure 12:
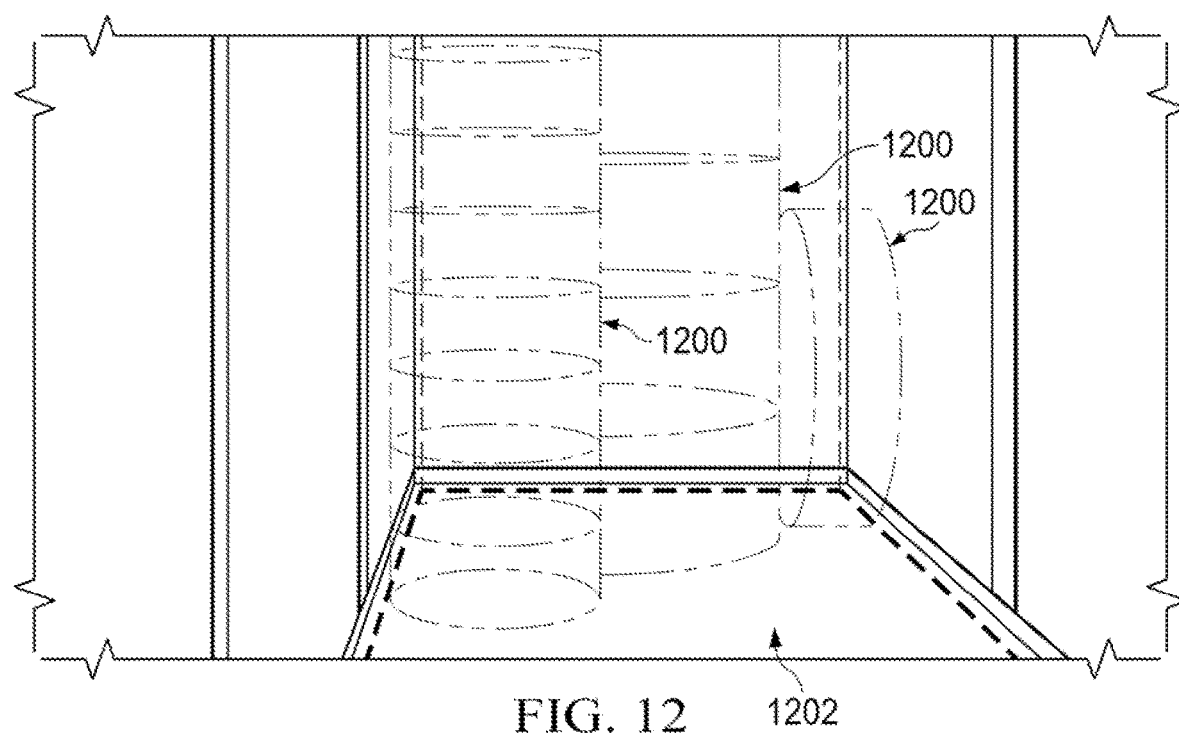
FIG. 12 illustrates an exemplary visualization of packing agricultural tires in an exemplary truck container, according to an embodiment.

FIG. 12 illustrates an exemplary visualization of packing agricultural tires in an exemplary truck container, according to an embodiment. Agricultural tires are shaped approximately as flattened cylinder and which may be stacked or laid on their side during shipment. According to embodiments, warehouse management system 110 may generate one or more picklists, packing plans, and instructions for packing objects that include one or more cylinder-shaped objects, such as the exemplary agricultural tires, packed in one or more packing areas, such as the exemplary truck container. In response to receiving the generated instructions, one or more instruction rendering devices 120 may render instructions as one or more visual and auditory elements directing the packing of agricultural tires according to the configuration of the packing plan. According to one embodiment, one or more instruction rendering devices 120 displays cylindrical object visualizations 1200 to indicate the location and orientation to place agricultural tires according to the packing plan. Additionally, according to embodiments, the packing area for the agricultural tires comprises a truck container having interior dimensions that define the available space within which the agricultural tires may be packed. One or more instruction rendering devices 120 may illustrate the packing area as packing volume 1202 comprising an outline of the interior edges of the truck container.

Additionally, as stated above, although objects comprising agricultural tires are described as cylinders packed into a box-shaped packing volume, embodiments contemplate packing one or more objects having one or more different shapes into one or more packing areas having one or more different shapes. For example, embodiments contemplate generating picklists, packing plans, and instructions for packing items, packages, containers, and packing areas with any suitable shape, including, for example, one or more of boxes, cylinders, spheres, and the like.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
a supply chain entity comprising an inventory having one or more items;
an instruction rendering device comprising one or more sensors and a display and configured to:
display augmented reality instructions and feedback according to instructions generated according to a packing plan;
overlay the augmented reality instructions and feedback in connection with a physical location of a container, wherein the instruction rendering device repeatedly updates the physical location of the augmented reality instructions and feedback according to a progress of a user in following the augmented reality instructions according to the packing plan;
display the augmented reality instructions and feedback in connection with a detected movement of the container or a detected movement of the instruction rendering device; and
identify on the instruction rendering device when one or more ordered items of the one or more items have been correctly placed and oriented in the container according to the packing plan.

2. The system of claim 1, wherein the instruction rendering device further comprises a head-mounted display, a smartphone, a tablet computer, a mobile device or a projector.

3. The system of claim 1, wherein the instruction rendering device is further configured to:
display the augmented reality instructions and feedback by overlaying one or more visual elements over a camera feed and altering an appearance and placement of the visual elements based on one or more frames of the camera feed.

4. The system of claim 1, wherein the augmented reality instructions and feedback further comprise displayed visual elements superimposed on a real-world packing area and the one or more ordered items.

5. The system of claim 1, wherein the augmented reality instructions and feedback further comprise:
a particular side of an item needs to be in an up direction, how many items may be packed on top of a particular item, or where in the container an item is to be placed.

6. The system of claim 1, wherein the feedback further comprises:
one or more visual elements comprising one or more of colors, symbols or text; and
one or more auditory elements comprising speech and sounds, wherein the feedback further comprises identification of completion or incompletion of an instruction, the identification of incompletion further comprising a degree to which the instruction has not been completed.

7. The system of claim 1, wherein the instruction rendering device is further configured to:
map an object visualization and a packing area boundary to a physical environment, such that a three dimensional representation of the container and a contour delineating an extent of a packing area are in a same spot regardless of where the instruction rendering device is located or positioned.

8. A computer-implemented method, comprising:
receiving, by a computer, a current state of one or more items in a supply chain network comprising one or more supply chain entities, wherein an inventory of the one or more supply chain entities is used to store the one or more items;
displaying, by an instruction rendering device, augmented reality instructions and feedback according to instructions generated according to a packing plan;
overlaying, by the instruction rendering device, the augmented reality instructions and feedback in connection with a physical location of a container, wherein the instruction rendering device repeatedly updates the physical location of the augmented reality instructions and feedback according to a progress of a user in following the augmented reality instructions according to the packing plan;
displaying, by the instruction rendering device, the augmented reality instructions and feedback in connection with a detected movement of the container or a detected movement of the instruction rendering device; and
identifying on the instruction rendering device when one or more ordered items of the one or more items have been correctly placed and oriented in the container according to the packing plan.

9. The method of claim 8, wherein the instruction rendering device further comprises a head-mounted display, a smartphone, a tablet computer, a mobile device or a projector.

10. The method of claim 8, further comprising:
displaying, by the instruction rendering device, the augmented reality instructions and feedback by overlaying one or more visual elements over a camera feed and altering an appearance and placement of the visual elements based on one or more frames of the camera feed.

11. The method of claim 8, wherein the augmented reality instructions and feedback further comprise displayed visual elements superimposed on a real-world packing area and the one or more ordered items.

12. The method of claim 8, wherein the augmented reality instructions and feedback further comprise:
a particular side of an item needs to be in an up direction, how many items may be packed on top of a particular item, or where in the container an item is to be placed.

13. The method of claim 8, wherein the feedback further comprises:
one or more visual elements comprising one or more of colors, symbols or text; and
one or more auditory elements comprising speech and sounds, wherein the feedback further comprises identification of completion or incompletion of an instruction, the identification of incompletion further comprising a degree to which the instruction has not been completed.

14. The method of claim 8, further comprising:
mapping, by the instruction rendering device, an object visualization and a packing area boundary to a physical environment, such that a three dimensional representation of the container and a contour delineating an extent of a packing area are in a same spot regardless of where the instruction rendering device is located or positioned.

15. A non-transitory computer-readable medium embodied with software, the software when executed configured to:
- receive a current state of one or more items in a supply chain network comprising one or more supply chain entities, wherein an inventory of the one or more supply chain entities is used to store the one or more items;
- display, by an instruction rendering device, augmented reality instructions and feedback according to instructions generated according to a packing plan;
- overlay, by the instruction rendering device, the augmented reality instructions and feedback in connection with a physical location of a container, wherein the instruction rendering device repeatedly updates the physical location of the augmented reality instructions and feedback according to a progress of a user in following the augmented reality instructions according to the packing plan;
- display, by the instruction rendering device, the augmented reality instructions and feedback in connection with a detected movement of one or more of the container and the instruction rendering device; and
- identify, by the instruction rendering device, when the one or more ordered items have been correctly placed and oriented in the container according to the packing plan.

16. The non-transitory computer-readable medium of claim 15, wherein the instruction rendering device further comprises a head-mounted display, a smartphone, a tablet computer, a mobile device or a projector.

17. The non-transitory computer-readable medium of claim 15, wherein the software is further configured to:
- display, by the instruction rendering device, the augmented reality instructions and feedback by overlaying one or more visual elements over a camera feed and altering an appearance and placement of the visual elements based on one or more frames of the camera feed.

18. The non-transitory computer-readable medium of claim 15, wherein the augmented reality instructions and feedback further comprise displayed visual elements superimposed on a real-world packing area and the one or more ordered items.

19. The non-transitory computer-readable medium of claim 15, wherein the augmented reality instructions and feedback further comprise:
- a particular side of an item needs to be in an up direction, how many items may be packed on top of a particular item, or where in the container an item is to be placed.

20. The non-transitory computer-readable medium of claim 15, wherein the feedback further comprises:
- one or more visual elements comprising one or more of colors, symbols or text; and
- one or more auditory elements comprising speech and sounds, wherein the feedback further comprises identification of completion or incompletion of an instruction, the identification of incompletion further comprising a degree to which the instruction has not been completed.

* * * * *